(12) United States Patent
Goto et al.

(10) Patent No.: US 8,627,346 B2
(45) Date of Patent: Jan. 7, 2014

(54) DISC CARTRIDGE

(75) Inventors: Naofumi Goto, Kanagawa (JP); Takeshi Kubo, Kanagawa (JP); Takeharu Takasawa, Kanagawa (JP); Akira Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 68 days.

(21) Appl. No.: 13/289,163

(22) Filed: Nov. 4, 2011

(65) Prior Publication Data

US 2012/0120786 A1 May 17, 2012

(30) Foreign Application Priority Data

Nov. 11, 2010 (JP) ................................ 2010-253066

(51) Int. Cl.
*G11B 21/08* (2006.01)
*G11B 7/085* (2006.01)
*G11B 33/02* (2006.01)

(52) U.S. Cl.
USPC ..................................... 720/657; 369/30.54

(58) Field of Classification Search
USPC .......... 720/609, 610, 639, 643, 644, 646, 647, 720/657, 738–744; 369/30.4, 30.41, 30.49, 369/30.51–30.54, 30.65, 30.66, 30.68, 369/30.69, 30.76, 30.77, 30.83
See application file for complete search history.

(56) References Cited

U.S. PATENT DOCUMENTS

| | | | | |
|---|---|---|---|---|
| 4,701,900 | A | * | 10/1987 | Hasegawa et al. ......... 369/30.84 |
| 5,121,278 | A | * | 6/1992 | Tanaka et al. ................ 360/133 |
| 5,323,382 | A | * | 6/1994 | Takahashi ..................... 720/728 |
| 7,178,885 | B2 | * | 2/2007 | Berkson et al. .............. 312/9.11 |
| 2003/0214754 | A1 | * | 11/2003 | Hanakawa et al. ........... 360/133 |
| 2005/0185529 | A1 | * | 8/2005 | Moribe et al. ............. 369/30.38 |
| 2006/0039083 | A1 | * | 2/2006 | Oishi ........................... 360/133 |
| 2006/0044686 | A1 | * | 3/2006 | Oishi ........................... 360/133 |
| 2007/0044118 | A1 | * | 2/2007 | Asakura et al. ............... 720/728 |
| 2009/0125933 | A1 | * | 5/2009 | Takizawa et al. ............. 720/728 |
| 2011/0119693 | A1 | * | 5/2011 | Takasawa et al. ............. 720/732 |

FOREIGN PATENT DOCUMENTS

JP         63-029392         2/1988

* cited by examiner

*Primary Examiner* — Wayne Young
*Assistant Examiner* — Adam B Dravininkas
(74) *Attorney, Agent, or Firm* — Sony Corporation

(57) ABSTRACT

A disc cartridge includes a case body for receiving disc-shaped recording media in an axial direction of a central shaft so that first and second shells respectively having a base surface portion parallel to a recording surface of the disc-shaped recording media are coupled separated by axial engagement/disengagement; and a lock lever supported perpendicular to the axial direction in the case body and locking the shells coupled. The shells are separated to form a disc insertion/extraction hole for the insert or discharge of the disc-shaped recording media into/from the case body. A support shaft serving as a pivoting point of the lock lever is installed to the case body. The lock lever includes a supported portion supported by the support shaft, a lock portion protruding from the supported portion and locking the shells, and a balance portion protruding from the supported portion approximately opposite to protrusion of the lock portion.

4 Claims, 31 Drawing Sheets

DISC CARTRIDGE

BACKGROUND

The present disclosure relates to a technical field of a disc cartridge. More particularly, the present disclosure relates to a technical field which prevents a lock from being released when an impact is applied thereto, by installing a balance unit protruding approximately in a direction substantially opposite to a lock unit to a lock lever which locks a first shell and a second shell into a coupled state.

A plurality of disc-shaped recording media may be received in a disc cartridge in parallel to an axial direction of a central shaft. The disc cartridge is, for example, used for a disc reproduction device for reproducing music, such that a desired disc-shaped recording medium is taken out by an extraction mechanism and music data recorded on the disc-shaped recording medium is reproduced (for example, see Japanese Unexamined Patent Application Publication 63-29392).

In addition, as the storage capacity of disc-shaped recording media has been greatly increasing recently, the necessity for a disc cartridge in which a plurality of disc-shaped recording media with large storage capacities may be received in parallel to the axial direction of the center shaft and which is used in a data center is also increasing.

The above disc cartridge is a type in which an outer circumference of each disc-shaped recording medium is inserted into a pair of support grooves and is received. Since this type of disc cartridge does not demand a disc tray which supports the disc-shaped recording medium, the receiving space may be devised so as to be smaller, and also the amount of preserved data may be devised so as to be greater by increasing the number of received media.

In addition, in regards to the disc cartridge, commercialization of a type in which the case body includes first and second shells capable of being separated, in which disc-shaped recording media may be received in or extracted from the case body when the first and second shells are separated, and which has a lock lever for locking the first and second shells in a coupled state has been considered.

SUMMARY

However, in regards to the disc cartridge in which the case body may be separated, when a great impact is applied to the case body, for example when the disc cartridge is dropped by mistake, the lock lever may move due to the impact so that the lock in the coupled state may be released.

If the lock is released unintentionally as described above, a problem in the data preservation may be caused due to the damage to the received disc-shaped recording medium or the ejection of the disc-shaped recording medium from the case body.

It is desirable to provide the disc cartridge capable of preventing a lock from being released when an impact is applied thereto.

A disc cartridge according to an embodiment of the present disclosure includes a case body capable of receiving a plurality of disc-shaped recording media in parallel to an axial direction of a central shaft thereof so that a first shell having a base surface portion parallel to a recording surface of the disc-shaped recording media and a second shell having a base surface portion parallel to the recording surface of the disc-shaped recording media are coupled to or separated from each other by engagement or disengagement in the axial direction; and a lock lever pivotally supported on a surface perpendicular to the axial direction in the case body and locking the first shell and the second shell in a coupled state, wherein the first shell and the second shell are separated to form a disc insertion/extraction hole through which the disc-shaped recording media are inserted into or discharged from the case body, wherein a support shaft serving as a pivoting point of the lock lever is installed to the case body, and wherein the lock lever includes a supported portion supported by the support shaft, a lock portion protruding from the supported portion and locking the first shell and the second shell, and a balance portion protruding from the supported portion in a direction approximately opposite to the direction in which the lock portion protrudes.

Therefore, in regards to the disc cartridge, the center of the lock lever may be set to be present in the supported portion.

In the disc cartridge, it is desirable that a regulating surface for regulating the location of the disc-shaped recording media received in the case body be formed at the balance portion of the lock lever.

Since the regulating surface regulating the location of the disc-shaped recording media is formed at the balance portion of the lock lever, the location of the disc-shaped recording media is regulated by the balance portion optimizing the location of the center of the lock lever.

In regards to the disc cartridge, it is desirable that the regulating surface of the lock lever have an arc surface shape along the outer circumference of the disc-shaped recording media.

Since the regulating surface of the lock lever has an arc surface shape along the outer circumference of the disc-shaped recording media, the regulating surface may be located closer to the outer circumference of the disc-shaped recording media.

In the disc cartridge, it is desirable that a center pin inserted into a center hole of the received disc-shaped recording media and regulating the location of the disc-shaped recording media be installed to the case body.

Since the center pin regulating the location of the disc-shaped recording media is installed to the case body, when the first shell and the second shell are coupled, the location of the disc-shaped recording media is regulated at the same time.

In the disc cartridge, it is desirable that an opening/closing panel for opening or closing the disc insertion/extraction hole be installed to the first shell, the difference between the diameter of the center pin and the diameter of the center hole of the disc-shaped recording media be set to A, the difference between the diameter of a circle extending from the arc of the regulating surface of the lock lever and the diameter of the disc-shaped recording media be set to B, the difference between the outer circumference of the disc-shaped recording media and the inner surface of the opening/closing panel when the disc-shaped recording media is pressed to the center pin in a direction of being inserted from the disc insertion/extraction hole be set to C, and C>A>B.

Since the opening/closing panel opening or closing the disc insertion/extraction hole is installed to the first shell and C>A>B, when the location of the disc-shaped recording media is misaligned, the outer circumference of the disc-shaped recording media does not contact the inner surface of the opening/closing panel.

In the disc cartridge, it is desirable that a location regulating protrusion protruding from the supported portion in a direction orthogonal to the axial direction of the support shaft and having a front end surface located opposite to the outer circumference of the disc-shaped recording media received in the case body be installed to the lock lever, and that in the state in which the first shell and the second shell are locked by the lock lever, the location regulating protrusion be located at the disc insertion/extraction hole rather than a line connecting the axial center of the support shaft and the center of the disc-shaped recording media.

Since the location regulating protrusion is located at the disc insertion/extraction hole rather than the line connecting the axial center of the support shaft and the center of the disc-shaped recording media, when an impact is applied to the case body and the disc-shaped recording media contact the location regulating protrusion, a pivoting force in a direction of locking the first shell and the second shell is applied to the lock lever.

In the disc cartridge, it is desirable that the front end surface of the location regulating protrusion have a curved shape convex at the front end side.

Since the front end surface of the location regulating protrusion has a curved shape convex at the front end side, the outer circumference of the disc-shaped recording media contacts the curved surface.

In the disc cartridge, it is desirable that the balance portion be installed as the location regulating protrusion.

Since the balance portion is installed as the location regulating protrusion, the balance portion and the location regulating protrusion are integrated into a portion with the same function.

In the disc cartridge, it is desirable that the lock lever be pivotally supported by any one of the first shell and the second shell, a lock protrusion be installed to the lock portion, a lock concave portion into which the lock protrusion of the lock lever is inserted in the coupled state be formed at the other one of the first shell and the second shell, a fitting concave portion opened in the axial direction of the support shaft be formed at any one of the lock protrusion and the lock concave portion, and a fitting protrusion protruding in the axial direction of the support shaft and capable of being fitted to the fitting concave portion when a force in a separating direction is applied to at least one of the first shell and the second shell locked in the coupled state be installed to the other end of the lock protrusion and the lock concave portion.

Since fitting protrusion capable of being fitted to the fitting concave portion when a force is applied to at least one of the first shell and the second shell in a separating direction is installed, the pivotal movement of the lock protrusion of the lock lever in a direction to be extracted from the first lock concave portion is regulated.

The disc cartridge according to the embodiment of the present disclosure includes a case body capable of receiving a plurality of disc-shaped recording media in parallel to an axial direction of a central shaft thereof so that a first shell having a base surface portion parallel to a recording surface of the disc-shaped recording media and a second shell having a base surface portion parallel to the recording surface of the disc-shaped recording media are coupled to or separated from each other by engagement or disengagement in the axial direction; and a lock lever pivotally supported on a surface perpendicular to the axial direction in the case body and locking the first shell and the second shell in a coupled state, wherein the first shell and the second shell are separated to form a disc insertion/extraction hole through which the disc-shaped recording media are inserted into or discharged from the case body, wherein a support shaft serving as a pivoting point of the lock lever is installed to the case body, and wherein the lock lever includes a supported portion supported by the support shaft, a lock portion protruding from the supported portion and locking the first shell and the second shell, and a balance portion protruding from the supported portion in a direction approximately opposite to the direction in which the lock portion protrudes.

Therefore, since the center of the lock lever is closer to the center of the supported portion, when a great impact is applied to the case body, the lock lever is not easily pivoted by the impact, and the lock in the coupled state is not easily released such that the data recorded in the disc-shaped recording medium may be preserved in a good state.

In regards to the disc cartridge according to the embodiment of the present disclosure, a regulating surface for regulating the location of the disc-shaped recording media received in the case body is formed at the balance portion of the lock lever.

Therefore, the location deviation of the disc-shaped recording media may be prevented, and the number of components may be reduced.

In regards to the disc cartridge according to the embodiment of the present disclosure, the regulating surface of the lock lever has an arc surface shape along the outer circumference of the disc-shaped recording media.

Therefore, the positioning accuracy of the disc-shaped recording media may be improved.

In the disc cartridge according to the embodiment of the present disclosure, a center pin inserted into a center hole of the received disc-shaped recording media and regulating the location of the disc-shaped recording media is installed to the case body.

Therefore, when the first shell and the second shell are coupled, the location of the disc-shaped recording media is regulated at the same time, and the location of the disc-shaped recording media may be simply and reliably regulated.

In the disc cartridge according to the embodiment of the present disclosure, an opening/closing panel for opening or closing the disc insertion/extraction hole is installed to the first shell, the difference between the diameter of the center pin and the diameter of the center hole of the disc-shaped recording media is set to A, the difference between the diameter of a circle extending from the arc of the regulating surface of the lock lever and the diameter of the disc-shaped recording media is set to B, the difference between the outer circumference of the disc-shaped recording media and the inner surface of the opening/closing panel when the disc-shaped recording media is pressed to the center pin in a direction of being inserted from the disc insertion/extraction hole is set to C, and C>A>B.

Therefore, when the first shell is moved with respect to the second shell and the first shell and the second shell are separated, the opening/closing panel does not contact the outer circumference of the disc-shaped recording media, and it is possible to prevent the disc-shaped recording media from being damaged or broken.

In the disc cartridge according to the embodiment of the present disclosure, a location regulating protrusion protruding from the supported portion in a direction orthogonal to the axial direction of the support shaft and having a front end surface located opposite to the outer circumference of the disc-shaped recording media received in the case body is installed to the lock lever, and, in the state in which the first shell and the second shell are locked by the lock lever, the location regulating protrusion is located at the disc insertion/extraction hole rather than a line connecting the axial center of the support shaft and the center of the disc-shaped recording media.

Therefore, when a great impact is applied to the case body, the locked state of the case body by the lock lever is not released, and the stable support of the disc-shaped recording media to the case body may be secured.

In the disc cartridge according to the embodiment of the present disclosure, the front end surface of the location regulating protrusion has a curved shape convex at the front end side.

Therefore, when the front end surface of the location regulating protrusion contacts the outer circumference of the disc-shaped recording media, it is possible to prevent the outer circumference of the disc-shaped recording media from being scratched or broken.

In the disc cartridge according to the embodiment of the present disclosure, the balance portion is installed as the location regulating protrusion.

Therefore, it is possible to simplify the structure of the lock lever and integrate functions of the lock lever.

In the disc cartridge according to the embodiment of the present disclosure, the lock lever is pivotally supported by any one of the first shell and the second shell, a lock protrusion is installed to the lock portion, a lock concave portion into which the lock protrusion of the lock lever is inserted in the coupled state is formed at the other one of the first shell and the second shell, a fitting concave portion opened in the axial direction of the support shaft is formed at any one of the lock protrusion and the lock concave portion, and a fitting protrusion protruding in the axial direction of the support shaft and capable of being fitted to the fitting concave portion when a force in a separating direction is applied to at least one of the first shell and the second shell locked in the coupled state is installed to the other end of the lock protrusion and the lock concave portion.

Therefore, the pivoting movement of the lock protrusion of the lock lever in a direction to be extracted from the lock concave portion is regulated, and it is possible to prevent the lock between the first shell and the second shell from being unnecessarily released by an impact.

BRIEF DESCRIPTION OF THE DRAWINGS

FIG. 1 is a perspective view of the disc cartridge.

FIG. 32 is an enlarged perspective view showing the second lock lever.

DETAILED DESCRIPTION OF EMBODIMENTS

Figure 1:
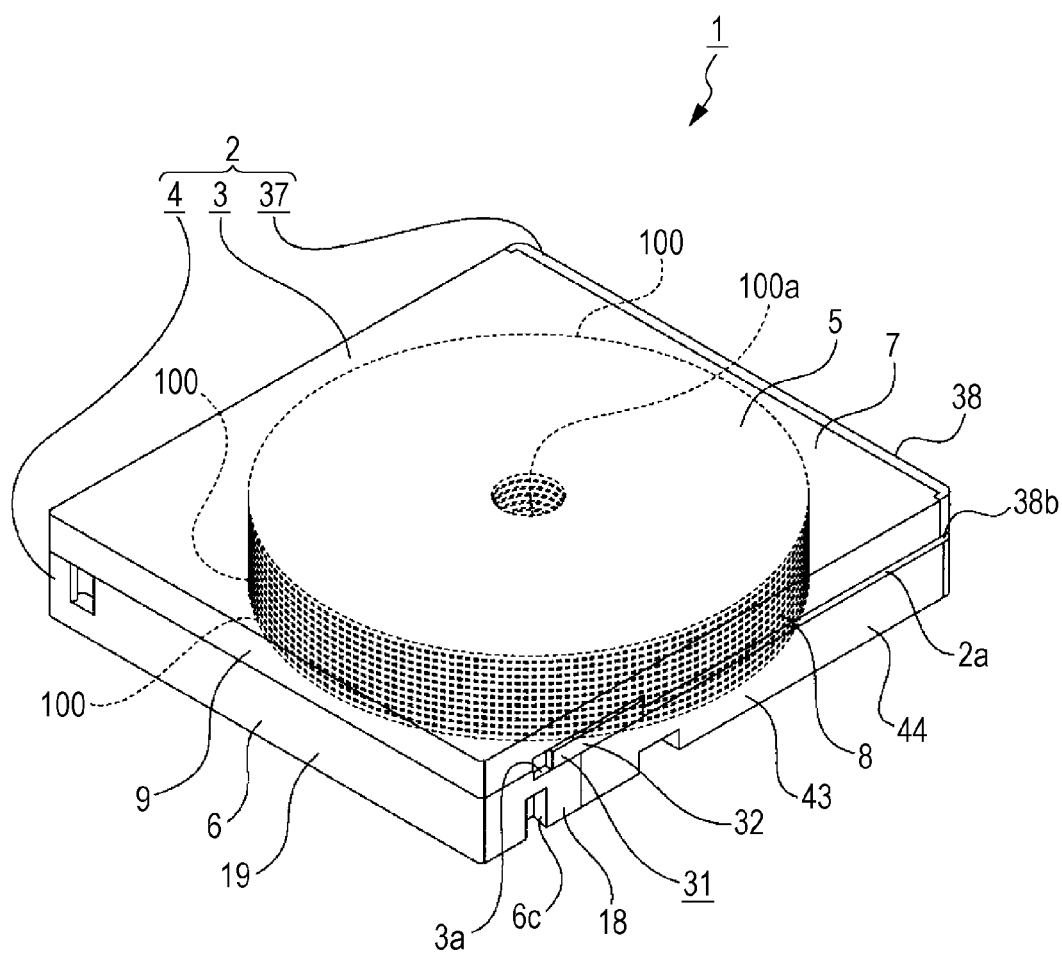
FIG. 1 shows embodiments of a disc cartridge of the present disclosure together with FIGS. 2 to 35.

Hereinafter, embodiments of a disc cartridge according to the present disclosure will be described with reference to the accompanying drawings.

In the following description, the front, rear, upper, lower, right and left directions are defined by setting the direction in which the disc cartridge is inserted from a cartridge insertion hole of a disc changer as a front direction.

In addition, the front, rear, upper, lower, right and left directions used herein are just for convenience, and the present disclosure is not limited to those directions.

[Overall Configuration]

A disc cartridge 1 is configured by disposing each necessary component in a case body 2, and the case body 2 includes a first shell 3 and a second shell 4. In the case body 2, a plurality of disc-shaped recording media 100, 100, . . . may be received at regular intervals in a vertical direction.

Figure 2:
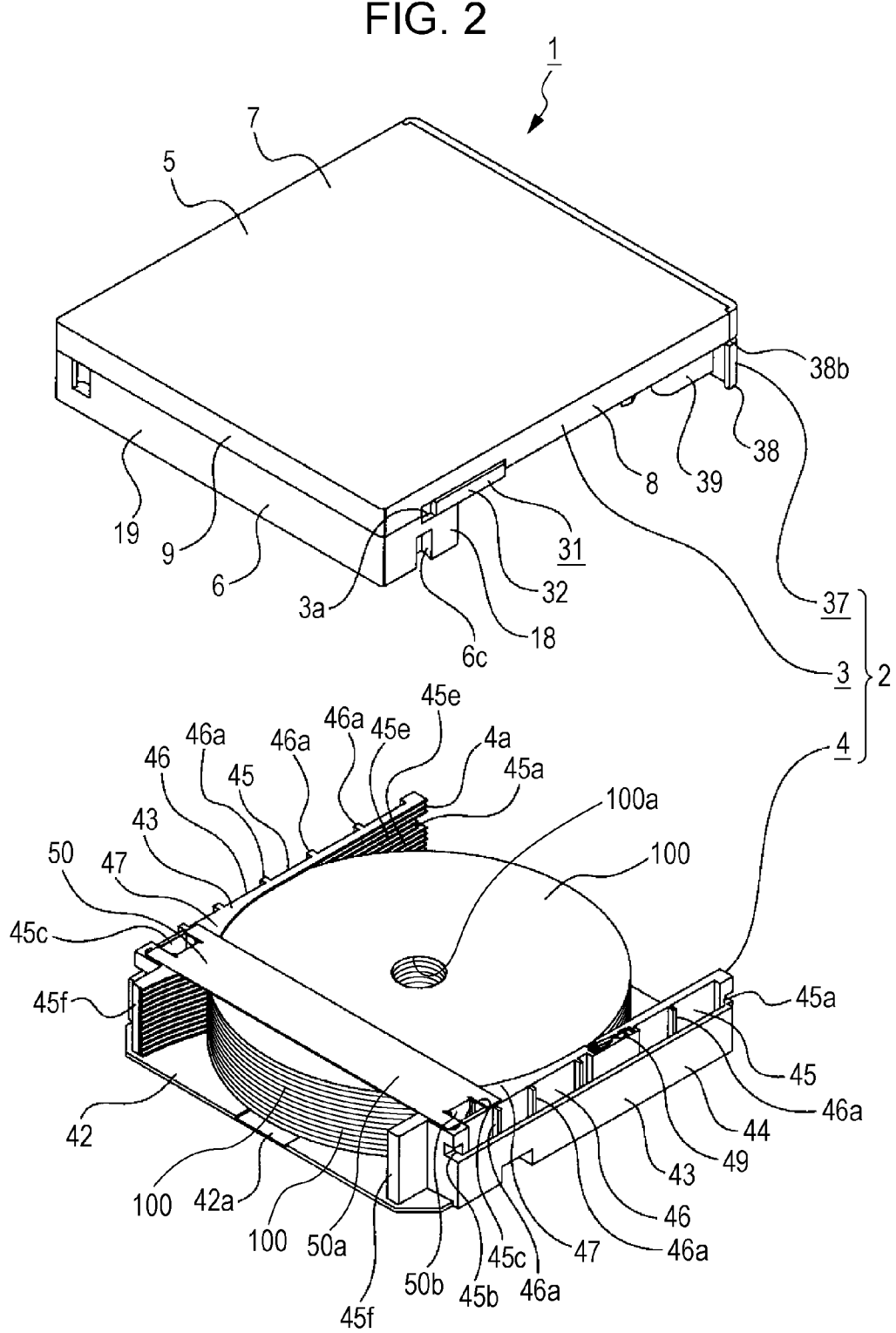
FIG. 2 is a perspective view of the disc cartridge showing a separated state of a first shell and a second shell.
Figure 3:
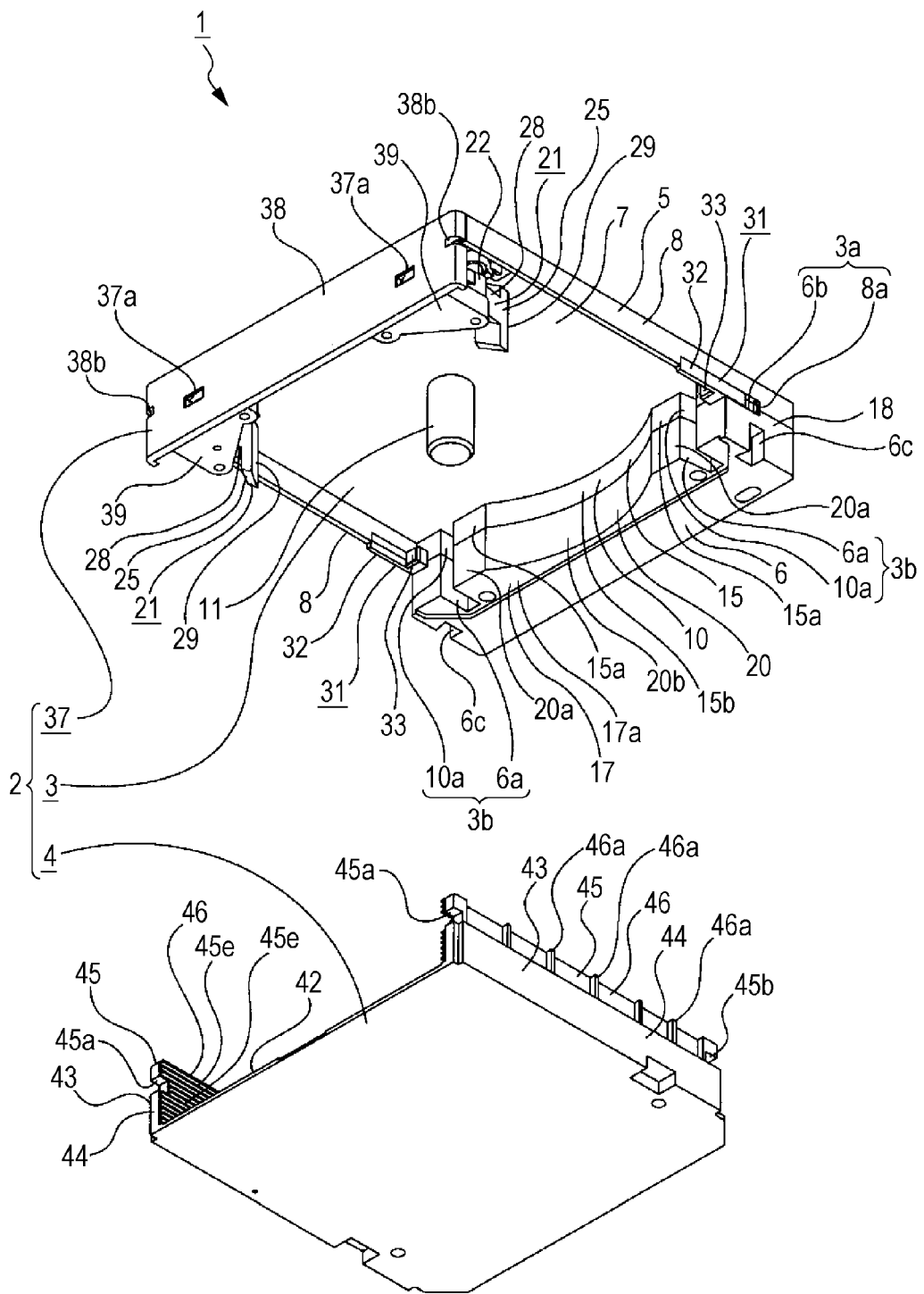
FIG. 3 is a perspective view of the disc cartridge showing a separated state of the first and second shells, observed in a direction different from FIG. 2.

The first shell 3 and the second shell 4 may be, for example, coupled to or separated from each other in a vertical direction (see FIGS. 1 to 3). In addition, in the case where the case body 2 is elongated in a vertical direction, the first shell 3 and the second shell 4 are coupled to or separated from each other in the right and left direction.

The first shell 3 is made of resin material and is configured by coupling a base body 5 and an auxiliary base 6 mounted to the rear end portion of the base body 5 in a vertical direction.

Figure 4:
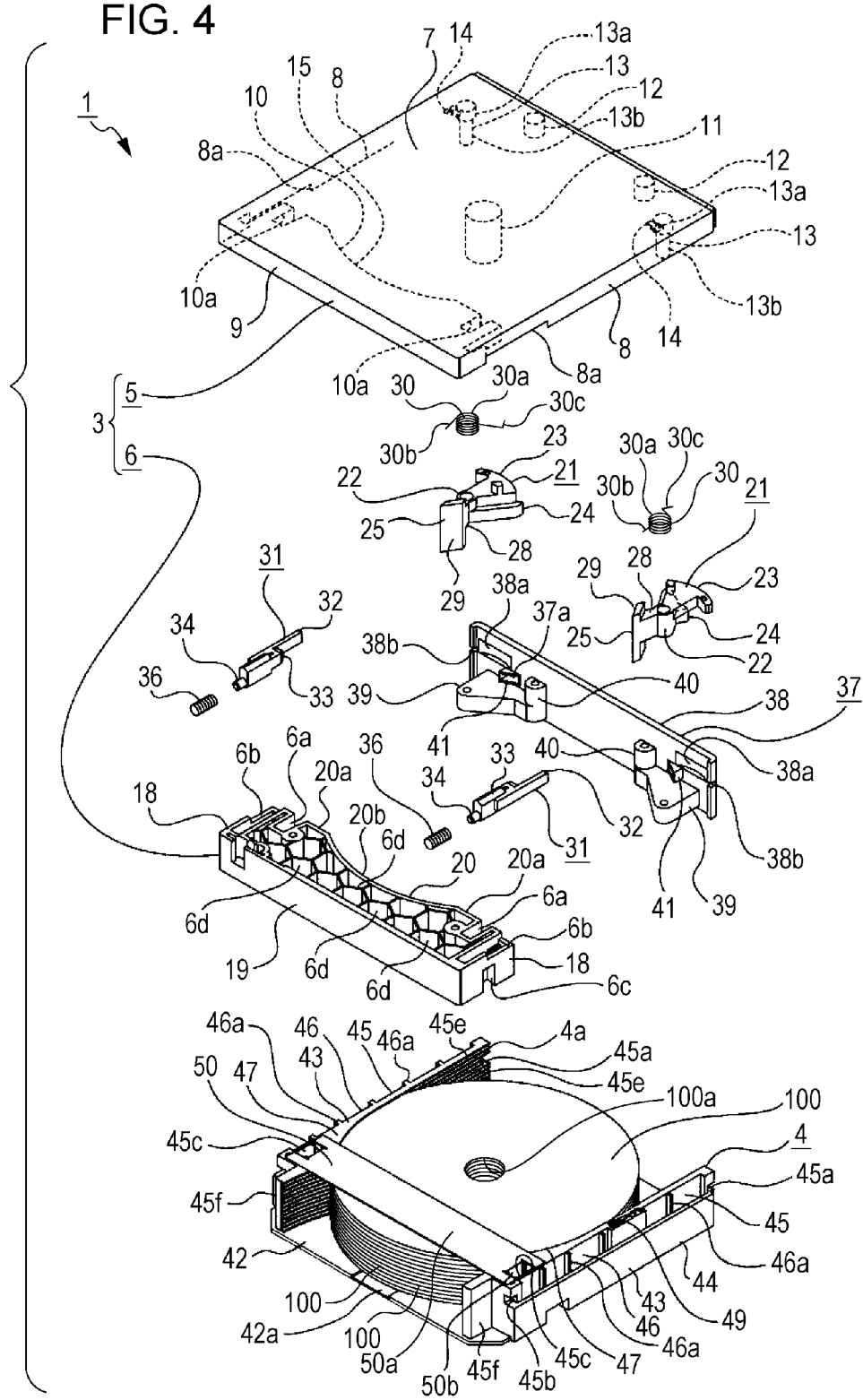
FIG. 4 is an exploded perspective view of the disc cartridge.
Figure 5:
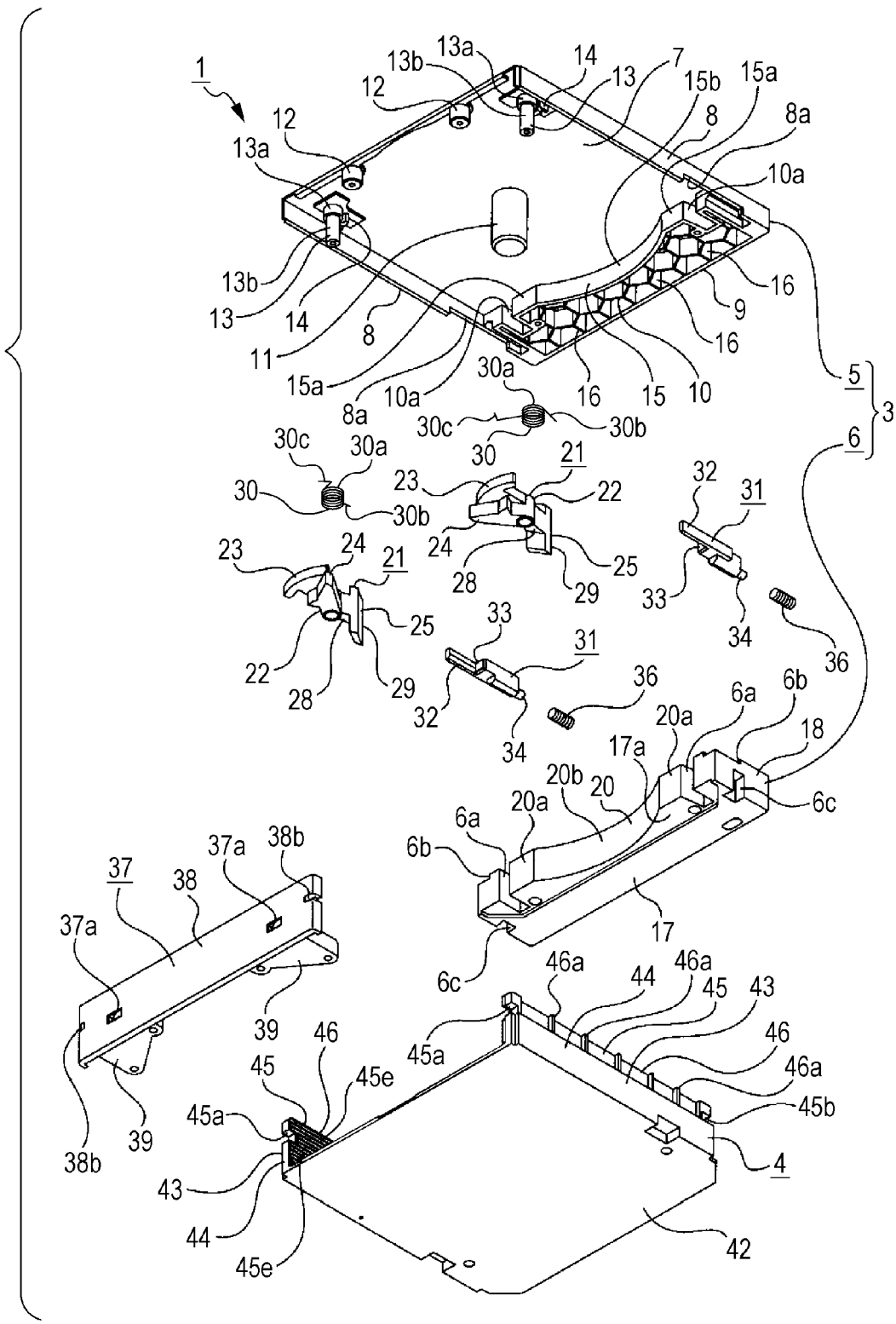
FIG. 5 is an exploded perspective view of the disc cartridge, observed from a direction different from FIG. 4.

The base body 5 includes, as shown in FIGS. 4 and 5, a base surface portion 7 oriented in a vertical direction, side surface portions 8 and 8 protruding downwards respectively from both right and left end portions of the base surface portion 7, a rear surface portion 9 protruding downwards from the rear end portion of the base surface portion 7, and a reinforcing portion 10 installed at the rear end portion in the lower surface side of the base surface portion 7.

A center pin 11 having an annular shaft shape protruding downwards is installed at the center portion of the base surface portion 7. Screw fixing bosses 12 and 12 protruding downwards are installed at the front end portion of the base surface portion 7 to be spaced apart from each other in the right and left direction.

Support shafts 13 and 13 protruding downwards are installed at the locations of the front end side of the base surface portion 7 to be spaced apart from each other in the right and left direction, and in the support shafts 13 and 13, each upper end portion is installed as a spring support portion 13*a* and 13*a*, and the region other than the upper end portion is installed as a lever support portion 13*b* and 13*b* having a diameter smaller than that of the spring support portion 13*a* and 13*a*. In the lower surface of the base surface portion 7, spring-hanging protrusions 14 and 14 are respectively installed near the support shafts 13 and 13.

Support concave portions 8*a* and 8*a* opening downwards are respectively formed at locations of the rear end side of the side surface portions 8 and 8.

The reinforcing portion 10 includes an outer wall 15 located at a front side and oriented in the right and left direction and a plurality of partition walls 16, 16, . . . installed in the region surrounded by the outer wall 15, the rear end portions of the side surface portions 8 and 8, and the rear surface portion 9, and is opened downwards. The partition walls 16, 16, . . . have ends successively installed to the base surface portion 7, each side surface portion 8 and 8, the rear surface portion 9, or the outer wall 15.

The outer wall 15 includes both right and left ends which are installed as planar portions 15*a* and 15*a* oriented to the front, and the region between the planar portions 15*a* and 15*a* is installed as a regulating unit 15*b* formed with a concave smooth arc shape at the front portion. The curvature of the regulating unit 15*b* is the same as the curvature of the outer circumference of the disc-shaped recording medium 100.

Concave portions 10*a* and 10*a* opened forwards and downwards are respectively formed in the reinforcing portion 10 at both right and left sides of the regulating unit 15*b*.

The partition walls 16, 16, . . . have, for example, a regular hexagonal shape or its partial shape. However, the shape of the partition walls 16, 16, . . . is not limited to the regular hexagonal shape or its partial shape, and may have any shape with a hollow therein.

The auxiliary base 6 includes a bottom plate 17 having a long lateral length, side plates 18 and 18 protruding upwards respectively from both right and left end portions of the bottom plate 17, a rear plate 19 protruding upwards from the rear end portion of the bottom plate 17, and a front plate 20 protruding upwards from the front end portion of the bottom plate 17, and is opened upwards. The auxiliary base 6 functions as a reinforcing portion for reinforcing the first shell 3 and enhancing the strength of the first shell 3, similar to the reinforcing portion 10.

A thin concave-shaped portion 17*a* is formed at the lower surface side at the rear end portion of the bottom plate 17.

The front plate 20 is installed as planar portions 20*a* and 20*a* having both right and left ends oriented in a front direction, and the region between the planar portions 20*a* and 20*a* is installed as a regulating unit 20*b* formed with a concave smooth arc shape at the front portion. The front surface portion 20 is formed to have the same size and shape as the outer wall 15 of the auxiliary unit 10 in the base body 5 of the first shell 3.

In the auxiliary base 6, concave portions 6*a* and 6*a* opened upwards and forwards are respectively formed at both right and left sides of the regulating unit 20*b*. Support concave portions 6*b* and 6*b* opened upwards are respectively formed at both right and left end portions of the auxiliary base 6. Groove-shaped grip portions 6*c* and 6*c* opened sidewards and downwards are respectively formed at the lower end portions of the both right and left end portions of the auxiliary base 6.

A plurality of partition walls 6*d*, 6*d*, . . . are installed in the auxiliary base 6. The partition walls 6*d*, 6*d*, . . . are successively installed at the bottom plate 17, the side plates 18 and 18, the rear plate 19 and the front plate 20, and are formed with the same size and shape as the partition walls 16, 16, . . . , of the reinforcing portion 10.

The auxiliary base 6 is mounted to the base body 5 by screwing or the like. In the state in which the auxiliary base 6 is mounted to the base body 5, the partition walls 16, 16, . . . and the partition walls 6*d*, 6*d*, . . . overlap each other and form a plurality of spaces therein. In addition, the support concave portions 8*a* and 8*a* of the base body 5 and the support concave portions 6*b* and 6*b* of the auxiliary base 6 are located correspondingly at upper and lower positions, and slider support portions 3*a* and 3*a* are respectively formed thereto (see FIGS. 2 and 3). In addition, the concave portions 10*a* and 10*a* of the base body 5 and the concave portions 6*a* and 6*a* of the auxiliary base 6 are located correspondingly at upper and lower positions, and insert concave portions 3*b* and 3*b* are respectively formed thereto. In addition, the outer wall 15 of the base body 5 overlaps the front plate 20 of the auxiliary base 6.

Lock levers 21 and 21 are pivotally supported by the support shafts 13 and 13 of the first shell 3 (see FIGS. 3 and 5).

Figure 6:
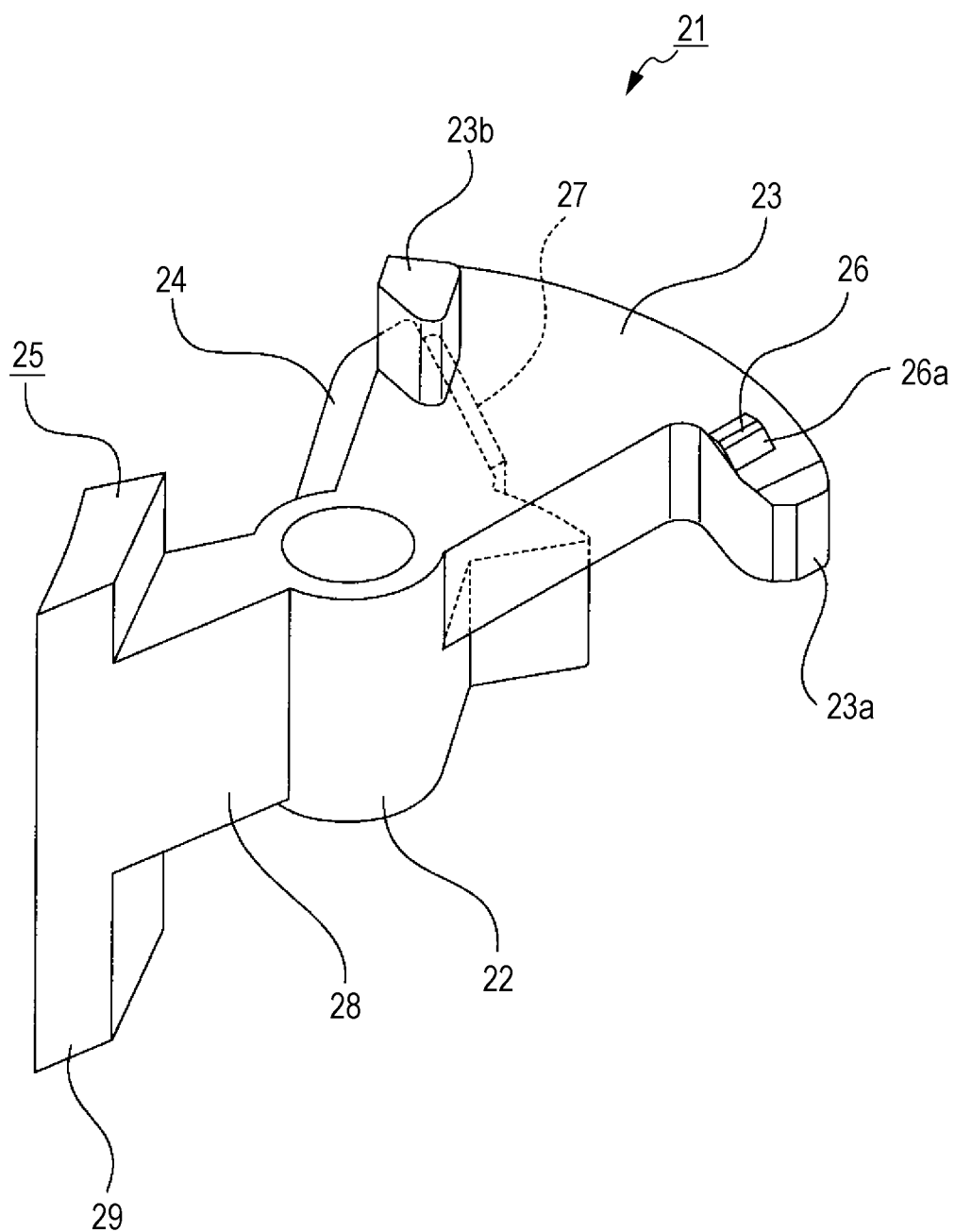
FIG. 6 is an enlarged perspective view of a lock lever.
Figure 7:
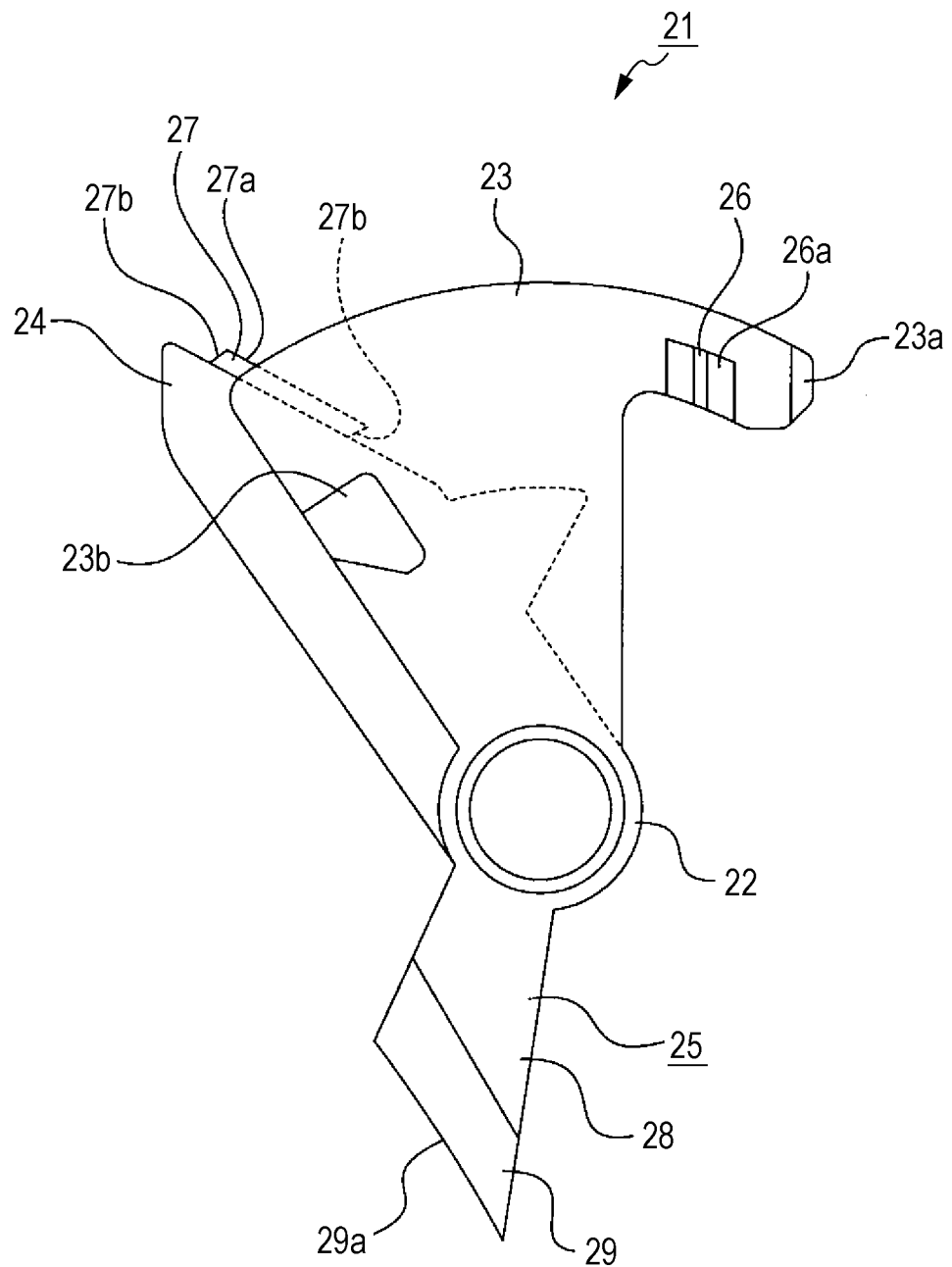
FIG. 7 is an enlarged plan view of the lock lever.

The lock lever 21 includes, as shown in FIGS. 6 and 7, a cylindrical supported portion 22 which is supported by inserting the support shaft 13, a lock portion 23 protruding approximately forwards from the approximate upper portion of the supported portion 22, a lock releasing portion 24 protruding forwards from the approximate lower portion of the supported portion 22, and a balance portion 25 protruding approximately rearwards from the supported portion 22.

The lock portion 23 has an outer circumference (the surface at the front side) formed with an arc surface shape based on the central axis of the supported portion 22 and has a lock protrusion 23a protruding sidewards at the front end portion. The lock protrusion 23a has a tapered shape whose outer shape decreases toward the front end. A protrusive portion 26 protruding upwards at the upper surface of the lock protrusion 23a is installed to the lock portion 23. The protrusive portion 26 has an inclined sliding contact surface 26a so that the protrusion portion 26 is displaced upwards according to movement away from the front end of the lock protrusion 23a.

A spring support protrusion 23b protruding upwards is installed to the lock portion 23.

An inserting protrusion 27 is installed at the front end portion of the lock releasing portion 24. The inserting protrusion 27 is formed to have an approximate plate shape with a long lateral length, and its front end surface is formed as an inclined surface 27a inclined in the right and left direction with respect to the front and rear direction. The right and left side surfaces 27b and 27b of the inserting protrusion 27 respectively have an arc surface shape based on the central axis of the supported portion 22.

The balance portion 25 includes a protrusion 28 protruding rearwards from the supported portion 22, and a regulating protrusion 29 protruding upwards and downwards from the front end portion of the protrusion 28. The rear side of the regulating protrusion 29 is formed as a regulating surface 29a formed with an arc surface shape along the outer circumference of the disc-shaped recording medium 100.

Figure 8:
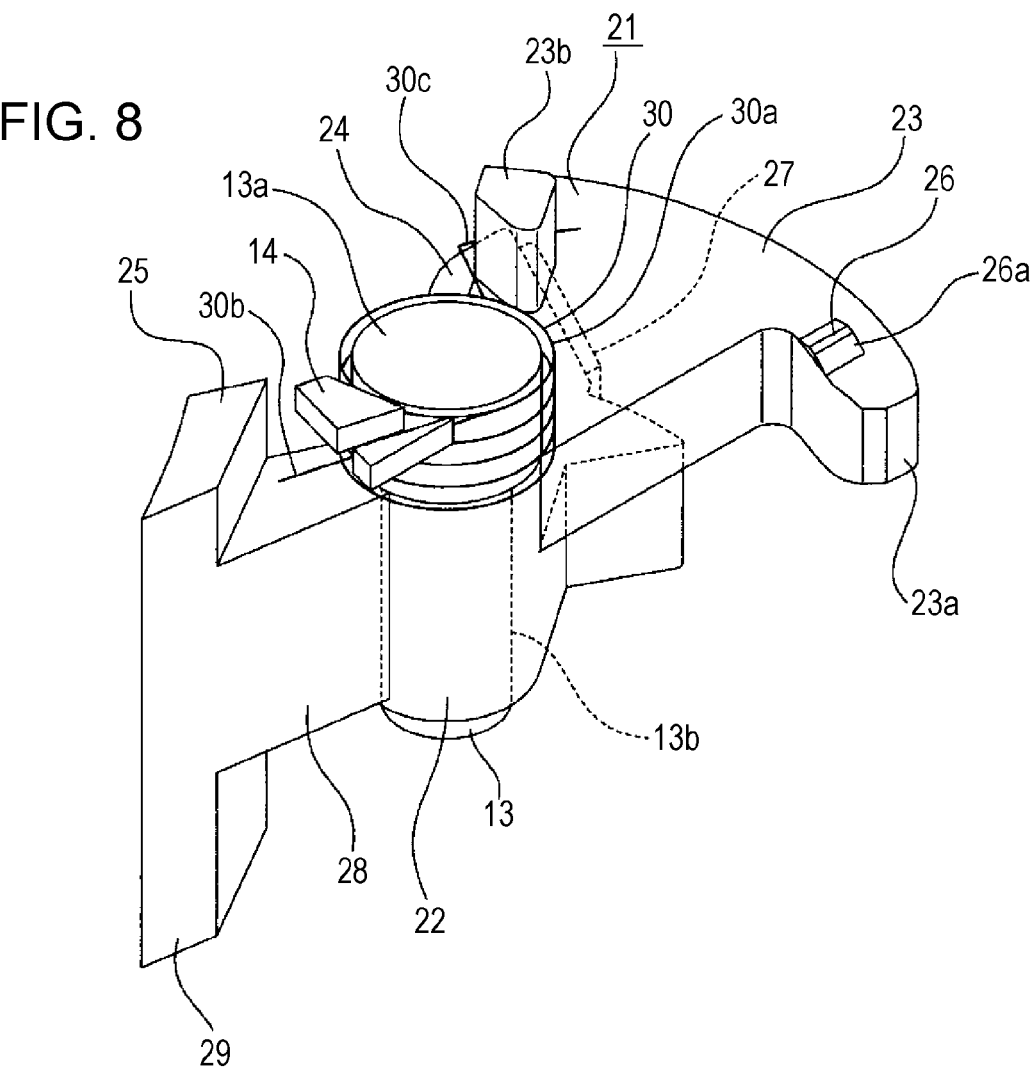
FIG. 8 is an enlarged perspective view showing the lock lever supported by a support shaft along with a bias spring.

The lock levers 21 and 21 are respectively pivotal based on the central axes of the support shaft 13 and 13, and the lever support portions 13b and 13b of the support shafts 13 and 13 are inserted into the supported portions 22 and 22 (see FIG. 8). In the state where the lock levers 21 and 21 are supported by the support shafts 13 and 13, the lock levers 21 and 21 are biased by bias springs 30 and 30 so that the locking protrusions 23a and 23a of the lock portions 23 and 23 are respectively closer to the side surface portions 8 and 8.

The bias spring 30 is, for example, a torsion coil spring, and includes a coil portion 30a and a pair of arm portions 30b and 30b respectively protruding from the coil portion 30a. The coil portion 30a of the bias spring 30 is supported by a spring support portion 13a of the support shaft 13, wherein one arm portion 30b is engaged with the spring-hooking protrusion 14 installed to the base surface portion 7 of the first shell 3, and the other arm portion 30c is engaged with a spring support protrusion 23b installed to the lock portion 23 of the lock lever 21.

The lock sliders 31 and 31 are respectively supported by the slider supports 3a and 3a of the first shell 3 to be slidable in a front and rear direction (see FIGS. 3 to 5).

Figure 9:
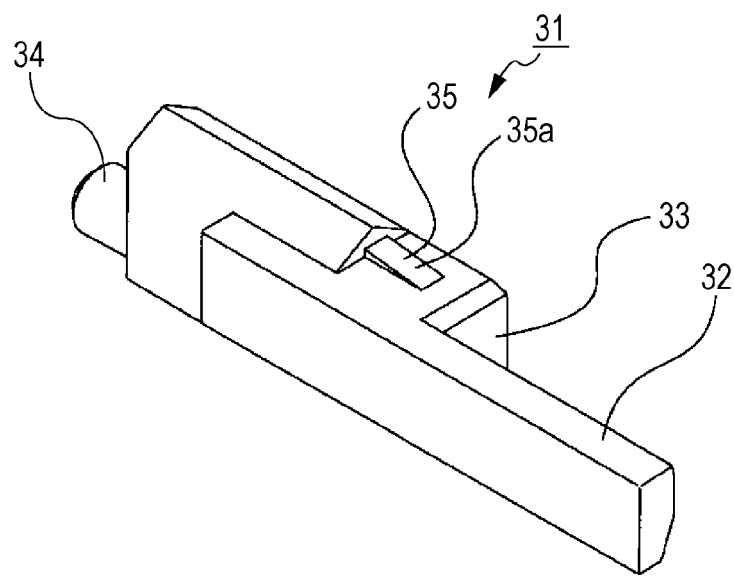
FIG. 9 is an enlarged perspective view showing a lock slider.

As shown in FIG. 9, the lock slider 31 includes a supported portion 32 elongating in a front and rear direction, a lock portion 33 protruding inwards from a region other than the front end portion of the supported portion 32, and a spring support shaft portion 34 protruding rearwards from the rear surface of the lock portion 33. A protrusive portion 35 protruding upwards is installed on the upper surface at a location of the front end side of the lock portion 33. The protrusive portion 35 has an inclined sliding contact surface 35a so as to be displaced upwards according to rearward movement.

The supported portions 32 and 32 of the lock sliders 31 and 31 are respectively slidably supported by the slider support portions 3a and 3a of the first shell 3, and coil springs 36 and 36 are supported by the spring support shaft portions 34 and 34. Both ends of the coil spring 36 respectively contact the rear surface of the lock portion 33 and the rear surface forming the slider support portion 3a. Therefore, the lock slider 31 is biased forwards by the coil spring 36.

An opening/closing panel 37 is mounted by a screw to the front end portion of the first shell 3 (see FIGS. 1 to 3). The opening/closing panel 37 includes, as shown in FIGS. 4 and 5, a panel portion 38 formed with a rectangular plate shape with a long lateral length and oriented forwards and rearwards, mounted protrusions 39 and 39 protruding rearwards from the lower end portion of the rear surface of the panel portion 38, screw fixing portions 40 and 40 installed to the rear surface of the panel portion 38, and insert portions 41 and 41 protruding rearwards from the rear surface of the panel portion 38.

Insertion concave portions 38a and 38a opened rearwards are formed in the rear surface of the panel portion 38 to be spaced apart from each other in the right and left direction. The insertion concave portions 38a and 38a are formed as concave portions with an arc shape. Inserting notches 38b and 38b opened outwards are respectively formed at both right and left end portions of the panel portion 38.

The mounted protrusions 39 and 39 are installed to be spaced apart from each other in the right and left direction, the screw fixing portions 40 and 40 are respectively installed in the mounted protrusions 39 and 39 to be spaced apart from each other in the right and left direction, and the insert portions 41 and 41 are respectively installed at the upper side of the mounted protrusions 39 and 39.

The insert portion 41 is formed with a triangular shape, when observed in a vertical direction, and has an inclined surface 41a whose front end surface gets closer to the panel portion 38 from the outer side to the inner side.

Insertion holes 37a and 37a are formed in the opening/closing panel 37 to be spaced apart from each other in the right and left direction. The insertion holes 37a and 37a are formed over the panel portion 38 and the insert portions 41 and 41.

The front ends of the mounted protrusions 39 and 39 of the opening/closing panel 37 are fixed by screws to the lower surfaces of the support shafts 13 and 13 installed to the base surface portion 7, and the screw fixing portions 40 and 40 are respectively fixed by screws to the lower surfaces of the screw fixing bosses 12 and 12 installed to the base surface portion 7 and mounted to the first shell 3.

In the state in which the opening/closing panel 37 is mounted to the first shell 3, the mounted protrusions 39 and 39 are respectively fixed by screws to the lower side of the support shafts 13 and 13, and it prevents the lock levers 21 and 21 and the bias springs 30 and 30 supported by the support shafts 13 and 13 from separating from the support shafts 13 and 13. In the state in which the mounted protrusions 39 and 39 are respectively screwed and mounted to the lower side of the support shafts 13 and 13, the upper surfaces of the mounted protrusions 39 and 39 are located closer to the lower surfaces of the lock portions 23 and 23 of the lock levers 21 and 21.

In the state in which the opening/closing panel 37 is mounted to the first shell 3, the lock releasing portions 24 and 24 of the lock levers 21 and 21 are located just behind the insertion holes 37a and 37a.

Figure 10:
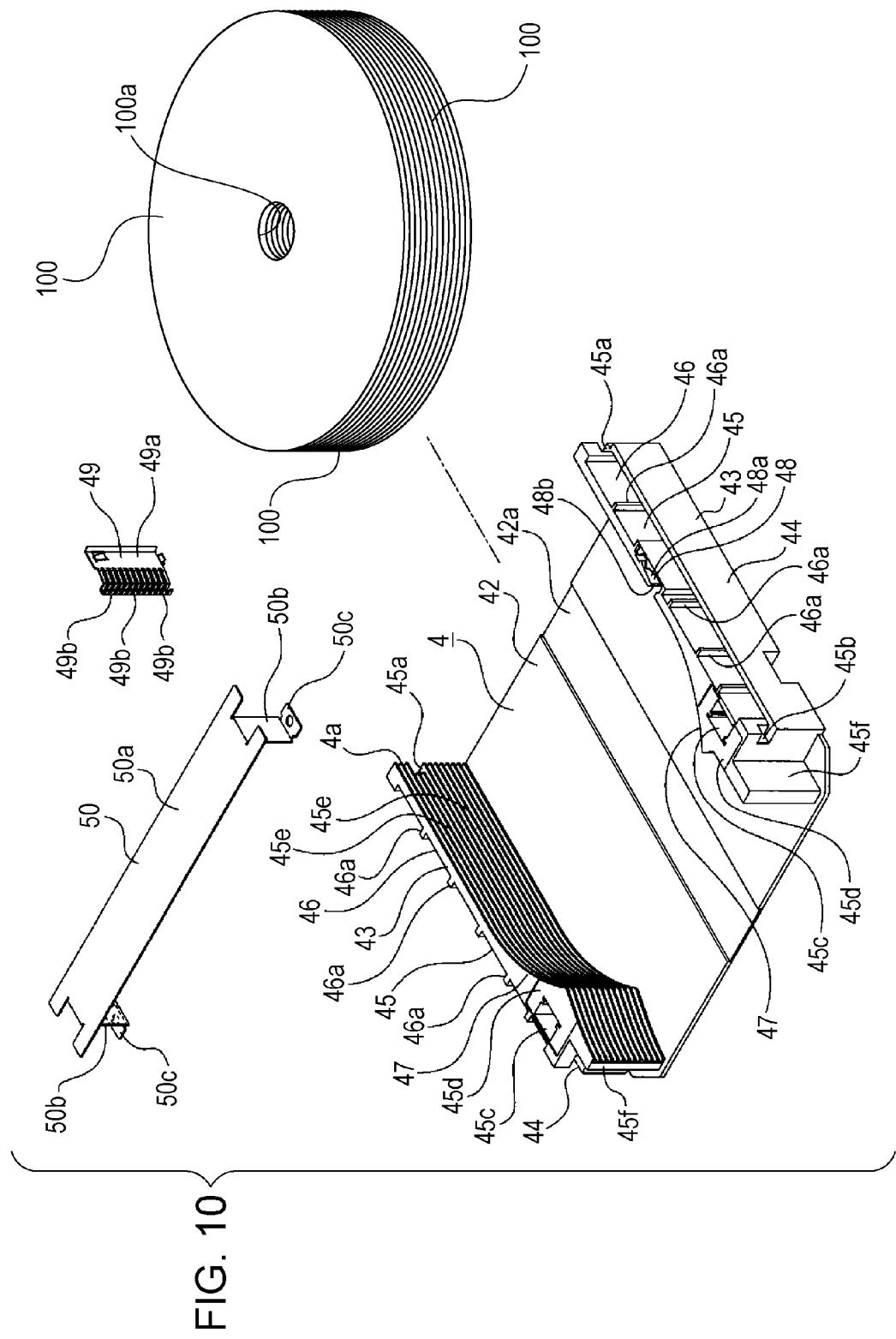
FIG. 10 is an exploded perspective view showing the second shell, a bridge member, a push spring, and a disc-shaped recording medium.

The second shell 4 is made of resin material and is formed by integrating a base surface portion 42 oriented in a vertical direction and side surface portions 43 and 43 respectively protruding upwards from both right and left ends of the base surface portion 42 (see FIGS. 3, 5 and 10).

The central portion of the base surface portion 42 in the right and left direction is installed as a thin-walled portion 42a having a slightly smaller thickness than other regions. The thin-walled portion 42a is formed upwards as a stepped surface concave.

The side surface portion 43 includes an outer side wall portion 44 and an inner side wall portion 45 located in the outer side wall portion 44, and a plurality of regular gaps spaced in the front and rear direction are formed between the outer side wall portion 44 and the inner side wall portion 45.

The outer side wall portion 44 has approximately half the height of the inner side wall portion 45, and the upper surface of the outer side wall portion 44 is lower than the upper surface of the inner side wall portion 45.

The inner side wall portion 45 includes a straight portion 46 extending in the front and rear direction and an arc portion 47 extending at the rear end side of the straight portion 46 and having an arc shape displacing inwards according to rearward movement.

A first lock concave portion 45a opened forwards and perforated in the right and left direction is formed in the front end portion of the inner side wall portion 45. A second lock concave portion 45b opened rearwards and outwards is formed at the rear end side of the straight portion 46 of the inner wall portion 45.

A mounting hole 45c opened upwards is formed in the rear end side of the inner wall portion 45. A stepped surface 45d having a slightly lower height than other regions is formed at the upper surface of the inner wall portion 45 around the mounting hole 45c.

Ribs 46a, 46a, . . . spaced apart from each other in a front and rear direction and extending in a vertical direction are formed on the outer surface of the straight portion 46 of the inner wall portion 45, and the outer surfaces of the ribs 46a, 46a, . . . are successive at the inner surface of the outer side wall portion 44. The rear end portion of the inner wall portion 45 is installed as an insert portion 45f protruding rearwards.

Support grooves 45e, 45e, . . . are formed in the inner surface of the inner wall portion 45, and the support grooves 45e, 45e, . . . are located to be spaced apart from each other at regular intervals in a vertical direction.

A spring-mounting concave portion 48 is formed in one inner wall portion 45. The spring-mounting concave portion 48 includes an insert mounting portion 48a opened upwards and a protruding concave portion 48b opened upwards and toward the inner surface of the straight portion 46, and the protruding concave portion 48b communicates with the rear end portion of the insert mounting portion 48a.

A push spring 49 is inserted and mounted in the spring-mounting concave portion 48 (see FIGS. 2 and 4). The push spring 49 is formed by, as shown in FIG. 10, integrating a plate-shaped mounted portion 49a having a great vertical length and spring portions 49b, 49b, . . . protruding from the rear circumference of the mounted portion 49a with metal material. The spring portions 49b, 49b, . . . are installed to be spaced apart at regular intervals in the vertical direction, identical to the vertical gaps of the support grooves 45e, 45e, . . . , and with the same number as the support grooves 45e, 45e, . . . .

The push spring 49 is mounted to a spring mounting portion 48 as the mounted portion 49a is inserted into the insert mounting portion 48a and the spring portions 49b, 49b, . . . are inserted into the protruding concave portion 48b. In the state in which the push spring 49 is mounted to the spring mounting portion 48, the front end portions of the spring portions 49b, 49b, . . . protrude into the straight portion 46.

A bridge member 50 is mounted between the side surface portions 43 and 43 of the second shell 4 (see FIGS. 2 and 10).

The bridge member 50 is formed by bending a plate-shaped metal material into a predetermined shape and includes a bridge portion 50a extending in the right and left direction, bending portions 50b and 50b formed by being bent downwards from both right and left end portions of the bridge portion 50a, and mounted surface portions 50c and 50c formed by being respectively bent outwards from the lower circumferences of the bending portions 50b and 50b.

The bridge portion 50a of the bridge member 50 has a thickness identical to the depth of the stepped surfaces 45d and 45d formed at the inner wall portions 45 and 45 of the second shell 4.

Figure 11:
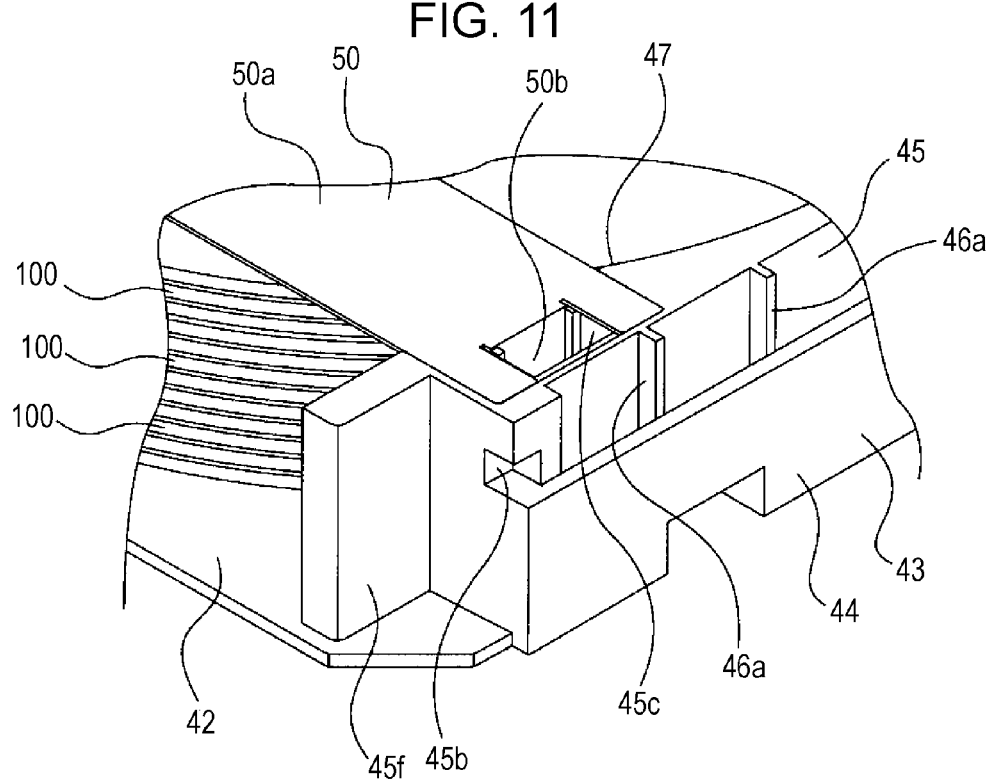
FIG. 11 is an enlarged perspective view showing a bridge member mounted to the second shell.
Figure 12:
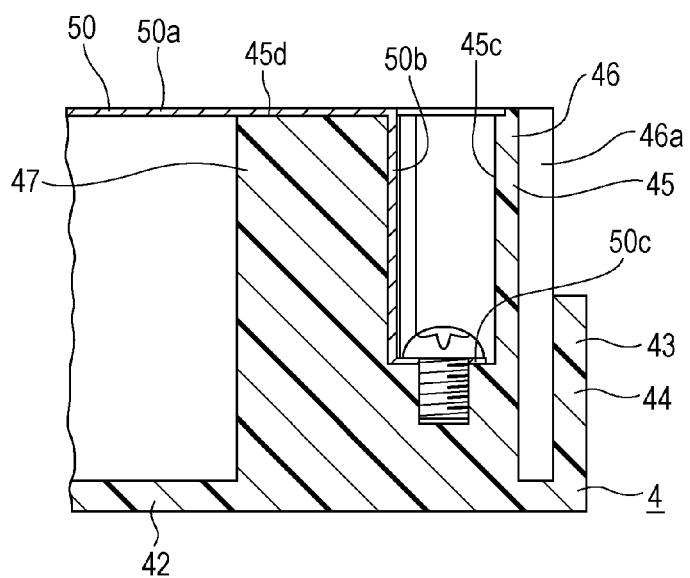
FIG. 12 is an enlarged cross-sectional view showing the bridge member mounted to the second shell.

The bending portions 50b and 50b and the mounted surface portions 50c and 50c of bridge member 50 are respectively inserted into the mounting holes 45c and 45c of the inner wall portions 45 and 45, and the mounted surface portions 50c and 50c are mounted to the second shell 4 by screwing or the like. In the state in which the bridge member 50 is mounted to the second shell 4, as shown in FIGS. 11 and 12, both right and left end portions of the bridge portion 50a are respectively disposed at the stepped surfaces 45d and 45d of the inner wall portions 45 and 45, and the upper surface of the bridge portion 50a is located on the same plane as the upper portion of the inner wall portions 45 and 45 other than the stepped surfaces 45d and 45d.

As described above, the second shell 4 has the thin-walled portion 42a at the central portion of the base surface portion 42 in the right and left direction, and the bridge member 50 is mounted between the side surface portions 43 and 43.

By installing the thin-walled portion 42a to the central portion of the base surface portion 42 in the right and left direction as described above, the region of the base surface portion 42 other than the thin-walled portion 42a has high strength so as not to cause deformation, and though stress may be easily concentrated at the thin portion 42a, since the side surface portions 43 and 43 are connected by the bridge member 50, the second shell 4 may secure a high strength as a whole.

In addition, since the side surface portions 43 and 43 are connected by the bridge member 50, the side surface portions 43 and 43 are supported while consistently maintaining a distance between them, and the location accuracy of the support grooves 45e, 45e, . . . formed in the side surface portions 43 and 43 is improved. Therefore, the location accuracy of the disc-shaped recording media 100, 100, . . . supported at the support grooves 45e, 45e, . . . is improved, and the disc-shaped recording media 100, 100, . . . may secure a good supporting state.

In addition, the second shell 4 is made of resin material, and the bridge member 50 is made of metal material. Therefore, the formability of the second shell 4 may be improved, and it is also possible to further improve the strength of the entire second shell 4 and the location accuracy of the side surface portions 43 and 43.

Moreover, the bridge member 50 includes the bridge portion 50a and one pair of the bending portions 50b and 50b protruding in directions orthogonal to each other from both right and left end portions of the bridge portion 50a. Therefore, the strength of the bridge member 50 is improved, and it is also possible to further improve the strength of the entire second shell 4 and the location accuracy of the side surface portions 43 and 43.

In addition, since the bridge member 50 is mounted so that the upper surface of the bridge portion 50a is located on the same plane as the upper surface of the side surface portions 43 and 43, the side surface portions 43 and 43 are respectively pressed inwards by both right and left end surfaces of the bridge portion 50a (see FIG. 12). Therefore, the location accuracy of the side surface portions 43 and 43 may be further improved.

Further, since the bridge member 50 is mounted so that the upper surface of the bridge portion 50a is located on the same plane as the upper surface of the side surface portions 43 and 43, the disc cartridge 1 may be devised so as to be thinner in the vertical direction.

Figure 13:
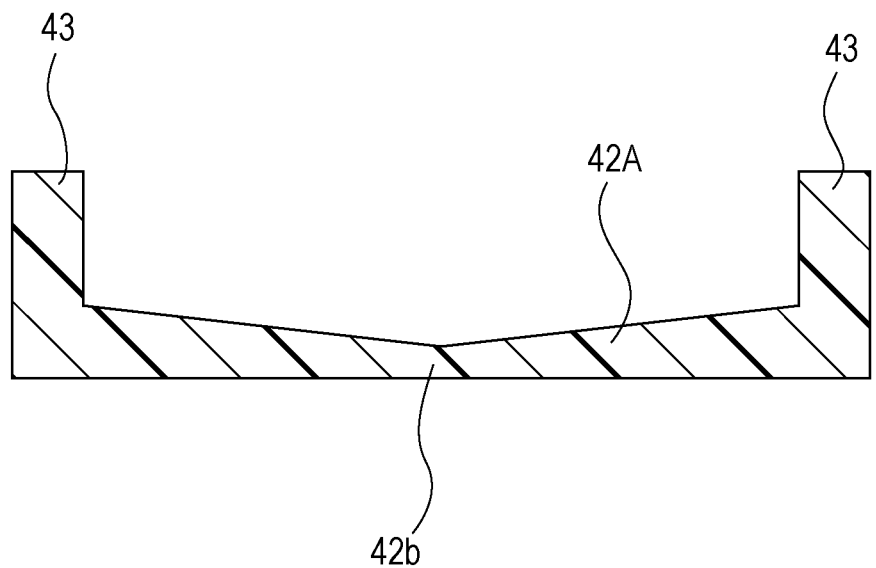
FIG. 13 is a cross-sectional view of the second shell showing another thin-walled portion.
Figure 14:
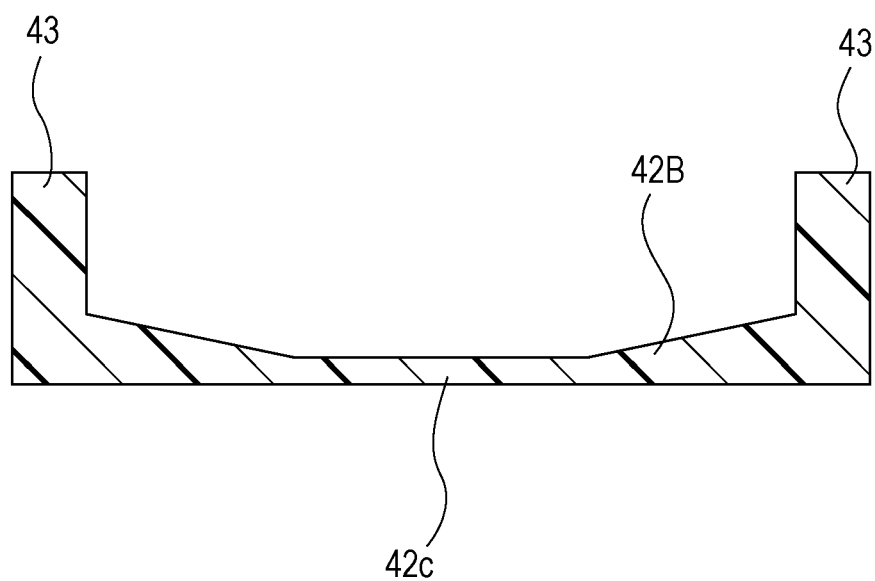
FIG. 14 is a cross-sectional view of the second shell showing still another thin-walled portion.

Though an example where the thin-walled portion 42a is installed by forming a step at the central portion of the base surface portion 42 in the right and left direction has been illustrated, the thin-walled portion is not limited to such a shape. For example, as shown in FIG. 13, the thin-walled portion 42b may be formed by forming the base surface portion 42A to have a smaller thickness toward the center, and as shown in FIG. 14, the thin-walled portion 42c may be formed by designing both right and left side portions of the base surface portion 42 to have gradually thinner thickness toward the center and consistent thicknesses in the center portion.

In the disc cartridge 1 configured as above, the disc-shaped recording media 100, 100, . . . are supported in the case body 2 (see FIG. 2). In the state in which the first and shell 3 and the second shell 4 are separated, the outer circumference of the disc-shaped recording medium 100 is inserted into the support grooves 45e and 45e formed in the side surface portions 43 and 43 of the second shell 4 from the front side and supported in the case body 2. Therefore, the opening located at the front end of the second shell 4 is formed as a disc insertion/extraction hole 4a through which the second shell 4 of the disc-shaped recording media 100, 100, . . . is inserted and extracted.

In the state in which the first shell 3 and the second shell 4 are coupled and the opening/closing panel 37 is mounted to the first shell 3 to configure the case body 2, insert grooves 2a and 2a extending in a front and rear direction are respectively formed between the lower surfaces of the side surface portions 8 and 8 of the first shell 3 and the upper surfaces of the outer side wall portions 44 and 44 of the second shell 4 (see FIG. 1). The rear ends of the insert grooves 2a and 2a respectively extend to the slider support portions 3a and 3a of the first shell 3, and the front ends of the insert grooves 2a and 2a respectively extend to inserting notches 38b and 38b formed in the panel portion 38 of the opening/closing panel 37.

In the state in which the case body 2 is configured as above, the outer surfaces of the ribs 46a, 46a, . . . installed to the inner wall portions 45 and 45 of the second shell 4 are respectively in contact with the inner surfaces of the side surface portions 8 and 8 of the first shell 3. Therefore, the inner wall portions 45 and 45 do not surface-contact the side surface portions 8 and 8, and when a load is applied to the first shell 3 from a lateral direction, the load transmitted to the inner wall portions 45 and 45 is lessened, thereby improving the impact resistance.

[Coupling Operation and Separating Operation of Disc Cartridge]

Hereinafter, the coupling operation and separating operation of the disc cartridge 1 will be described (see FIGS. 15 to 27).

First, the state in which the first shell 3 and the second shell 4 are coupled will be described (see FIGS. 15 to 16).

The first shell 3 and the second shell 4 are coupled to the base surface portion 7 of the base body 5 and the base surface portion 42 to be opposite to each other in a vertical direction.

In the state in which the first shell 3 and the second shell 4 are coupled, the first shell 3 and the second shell 4 are locked by the lock levers 21 and 21 and the lock sliders 31 and 31.

The lock levers 21 and 21 are located at pivotal ends of the lock protrusions 23a and 23a in directions (in an outward direction) spaced apart from each other by the biasing force of the bias springs 30 and 30 (see FIG. 15), and the lock protrusions 23a and 23a are inserted in and engaged with first lock concave portions 45a and 45a respectively formed at the side surface portions 43 and 43 of the second shell 4. At this time, the first lock concave portions 45a and 45a are sealed without a gap by the lock protrusions 23a and 23a.

The lock sliders 31 and 31 are located at a moving end at the front by the biasing force of the coil springs 36 and 36 (see FIGS. 15 and 16), and the lock portions 33 and 33 are inserted in and engaged with second lock concave portions 45b and 45b formed at the side surface portions 43 and 43 of the second shell 4.

In the state in which the first shell 3 and the second shell 4 are coupled and locked as described above so that the disc-shaped recording media 100, 100, . . . are supported in the case body 2, the spring portions 49b and 49b of the push spring 49 are respectively pressed in contact with a part of the outer circumferences of the disc-shaped recording media 100, 100, . . . (see FIG. 15). At this time, in the support grooves 45e, 45e, . . . , the outer circumferences of the disc-shaped recording media 100, 100, . . . other than the region formed at the arc surface portions 47 and 47 of the side surface portions 43 and 43 are positioned at regular locations in the case body 2.

In the state in which the disc-shaped recording media 100, 100, . . . are positioned at regular locations, the regulating unit 15b of the outer wall 15 installed at the reinforcing portion 10 of the first shell 3 or the regulating unit 20b of the front plate 20 installed at the auxiliary base 6 is located near the region of the rear end side of the outer circumference of the disc-shaped recording medium 100. In addition, the regulating surfaces 29a and 29a respectively formed at the balance portions 25 and 25 of the lock levers 21 and 21 are located near the region of the front end side of the outer circumference of the disc-shaped recording medium 100.

Therefore, even though the disc-shaped recording media 100, 100, . . . are displaced from their positioned locations due to a vibration or impact applied to the disc cartridge 1, the locations of the disc-shaped recording media 100, 100, . . . are regulated by the regulating unit 15b, the regulating unit 20b or the regulating surfaces 29a and 29a so that their positioned state is supported.

In addition, in the state in which the first shell 3 and the second shell 4 are coupled, the lock releasing portions 24 and 24 of the lock levers 21 and 21 are pressed to the inclined surfaces 41a and 41a of the insert portions 41 and 41 of the opening/closing panel 37 from the rear side by the biasing force of the bias springs 30 and 30. At this time, the inserting protrusions 27 and 27 are respectively inserted into the insertion holes 37a and 37a of the opening/closing panel 37 from the rear side.

As described above, in the disc cartridge 1, since the inserting protrusions 27 and 27 of the lock levers 21 and 21 are respectively inserted into the insertion holes 37a and 37a of the opening/closing panel 37, dust or moisture may not easily penetrate the case body 2 from the outside, the case body 2 has a high sealing property, and the data recorded in the disc-shaped recording media 100, 100, . . . may secure a good preservation state.

In addition, since the right and left side surfaces 27b and 27b of the inserting protrusions 27 and 27 respectively have an arc shape based on the central axes of the supported portions 22 and 22, when the lock levers 21 and 21 are pivoted, the inserting protrusions 27 and 27 may be easily inserted into and extracted from the insertion holes 37a and 37a. In addition, since the side surfaces 27b and 27b have an arc shape based on the central axes of the supported portions 22 and 22, in the state in which the inserting protrusions 27 and 27 are inserted into the insertion holes 37a and 37a, the case body 2 may secure a good sealing property regardless of pivoting positions of the lock levers 21 and 21.

Figure 17:
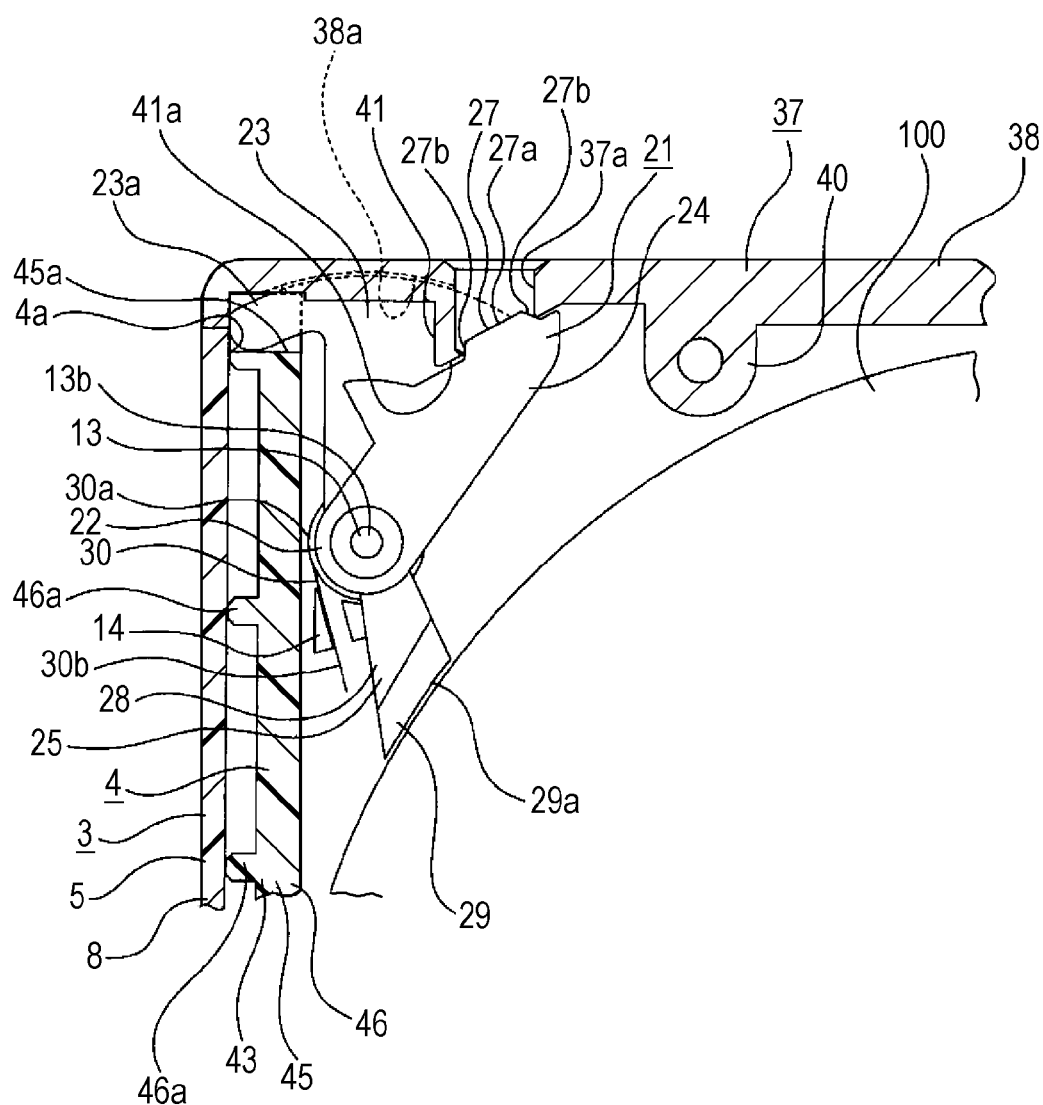
FIG. 17 is an enlarged cross-sectional view showing a tapered insertion protrusion inserted into an insertion hole of an opening/closing panel.

In addition, the inserting protrusions 27 and 27 may have a tapered shape whose outer shape decreases toward the front end, as shown in FIG. 17. By designating the inserting protrusions 27 and 27 to be formed to have a tapered shape, the outer circumferences of the inserting protrusions 27 and 27 may be easily closely adhered to the rear side opening edges of the insertion holes 37a and 37a, and the sealing property in the case body 2 may be further improved.

In addition, in regards to the disc cartridge 1, in the state in which the first shell 3 and the second shell 4 are coupled, the lock protrusions 23a and 23a of the lock portions 23 and 23 in the lock levers 21 and 21 are inserted into the first lock concave portions 45a and 45a formed in the side surface portions 43 and 43 of the second shell 4, and the first lock concave portions 45a and 45a are closed by the lock protrusions 23a and 23a.

Therefore, the sealing property in the case body 2 may be further improved.

In addition, since the lock protrusions 23a and 23a of the lock portions 23 and 23 are formed to have a tapered shape, the lock protrusions 23a and 23a may be easily closely adhered to the opening edges of the first lock concave portions 45a and 45a, and the sealing property in the case body 2 may be further improved.

In addition, the lock levers 21 and 21 may be respectively moved in an axial direction of the support shafts 13 and 13, and both upper and lower surfaces forming the insertion concave portions 38a and 38a of the opening/closing panel 37 are preferably inclined surfaces formed as guiding surfaces. By doing so, the lock levers 21 and 21 may be more easily inserted into the insertion concave portions 38a and 38a.

In the state where the first shell 3 and the second shell 4 are coupled, a center pin 11 installed at the first shell 3 is inserted into center holes 100a, 100a, ... of the disc-shaped recording media 100, 100, .... At this time, the inner surface of the panel portion 38 of the opening/closing panel 37 is closely located at the front ends of the disc-shaped recording media 100, 100, ....

Figure 18:
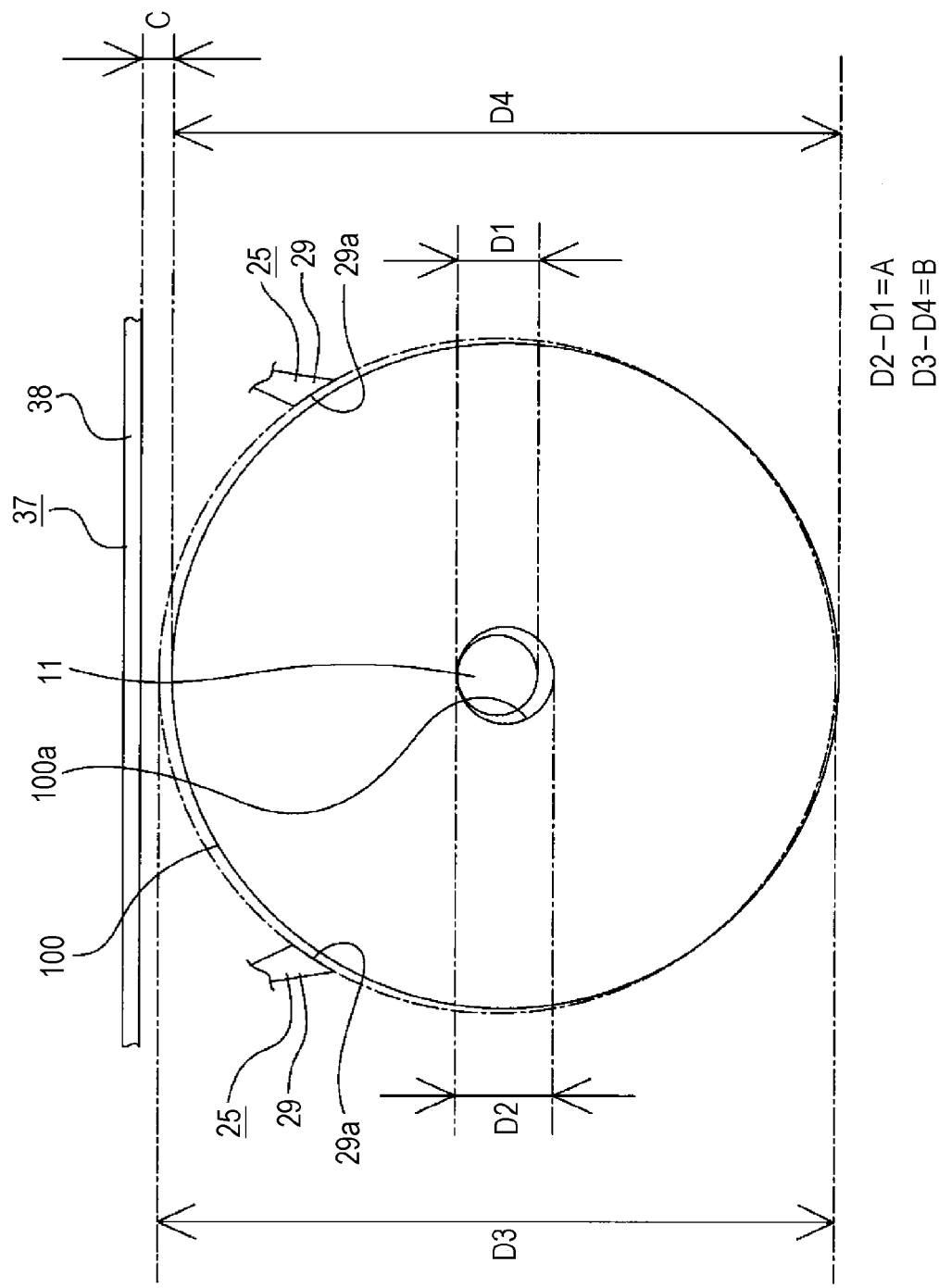
FIG. 18 is a schematic view for illustrating dimension relationships of each component.

In regards to the disc cartridge 1, the following dimension relations are set (see FIG. 18). In addition, FIG. 18 is a conceptual view showing the state in which the disc-shaped recording medium 100 is pressed rearwards by the center pin 11, for easy description.

The difference between the diameter D1 of the center pin 11 and the diameter D2 of the center hole 100a of the disc-shaped recording medium 100 is set to A, the difference between the diameter D3 of a circle extending from the regulating surfaces 29a and 29a respectively installed to the lock releasing portions 24 and 24 of the lock levers 21 and 21 and the diameter D4 of the disc-shaped recording medium 100 is set to B, and the difference between the outer circumference of the disc-shaped recording medium 100 when the disc-shaped recording medium 100 is pressed rearwards by the center pin 11 and the inner surface of the opening/closing panel 37 is set to C.

At this time, in regards to the disc cartridge 1, the dimension relationship of C>A>B is set.

Therefore, in the case where the location of the disc-shaped recording medium 100 is misaligned from the state of being positioned at the regular location (see FIG. 15), the outer circumference of the disc-shaped recording medium 100 comes into contact with the regulating surfaces 29a and 29a of the lock releasing portions 24 and 24 by B which is the smallest distance difference and therefore its location is regulated.

In addition, even in the case where a great impact or the like is applied to the disc cartridge 1 to cause a large location misalignment or deformation to the disc cartridge 1 or the disc-shaped recording medium 100, the inner circumference of the disc-shaped recording medium 100 comes into contact with the center pin 11 by A which is a smaller distance difference than C, and therefore the location of the disc-shaped recording medium 100 is regulated.

In the case where the location deviation of the disc-shaped recording medium 100 occurs as described above, the location of the disc-shaped recording medium 100 is regulated by the regulating surfaces 29a and 29a, or the location of the disc-shaped recording medium 100 is regulated by the center pin 11, so that the outer circumference of the disc-shaped recording medium 100 does not come into contact with the inner surface of the panel portion 38 of the opening/closing panel 37.

Therefore, when the first shell 3 moves upwards with respect to the second shell 4 so that the first shell 3 is separated from the second shell 4, the panel portion 38 does not come into contact with the outer circumference of the disc-shaped recording medium 100 and may prevent the disc-shaped recording medium 100 from being damaged or broken.

In addition, in the disc cartridge 1, the balance portion 25 is installed to the lock lever 21 locking the first shell 3 and the second shell 4 in addition to the supported portion 22, the lock portion 23 and the lock releasing portion 24, and the center of the lock lever 21 becomes located at or near the center of the supported portion 22 by installing the balance portion 25.

Therefore, when a great impact is applied to the case body 2, for example when the disc cartridge 1 is dropped by mistake, the lock levers 21 and 21 are not easily pivoted due to the impact, and the lock in the coupled state is not released. Even when a great impact is applied as described above, the lock is not released unintentionally, and therefore it is possible to preserve the data recorded in the disc-shaped recording medium 100 in a good state without causing the disc-shaped recording medium 100 received therein to be damaged and to be ejected from the case body 2.

In addition, since the center of the lock lever 21 is at or near the center of the supported portion 22, the load to the bias springs 30 and 30 may be lessened. In addition, the load to the bias springs 30 and 30 is identically lessened even in the case where the case body 2 is elongated vertically and the disc-shaped recording media 100, 100, ... are preserved in a horizontal direction.

In addition, since the regulating surfaces 29a and 29a regulating the location of the disc-shaped recording medium 100 are respectively formed at the balance portions 25 and 25 of the lock levers 21 and 21, it is possible to prevent the location deviation of the disc-shaped recording medium 100 and to decrease the number of components.

In addition, since the regulating surfaces 29a and 29a of the balance portions 25 and 25 have an arc surface shape along the outer circumference of the disc-shaped recording medium 100, it is possible to improve the positioning accuracy of the disc-shaped recording medium 100.

In addition, in regards to the disc cartridge 1, the center pin 11 inserted into the center holes 100a, 100a, ... of the disc-shaped recording media 100, 100, ... to regulate the locations of the disc-shaped recording media 100, 100, ... is installed to the case body 2. Therefore, when the first shell 3 and the second shell 4 are coupled, the locations of the disc-shaped recording media 100, 100, . . . are regulated at the same time, so that the location of the disc-shaped recording medium 100 may be simply and reliably regulated.

Figure 15:
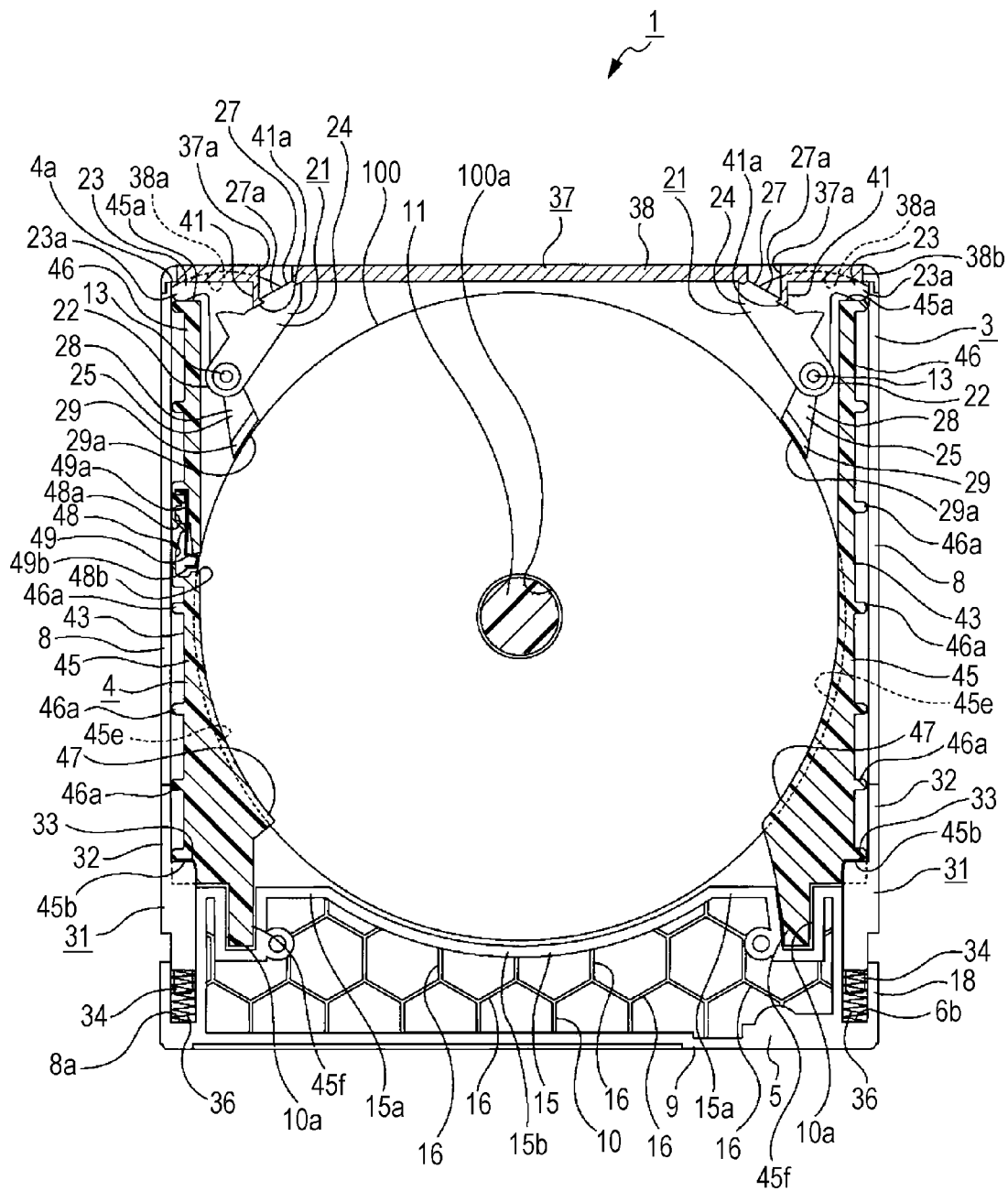
FIG. 15 is an enlarged cross-sectional view showing the disc-shaped recording medium positioned and supported at a regular location.
Figure 16:
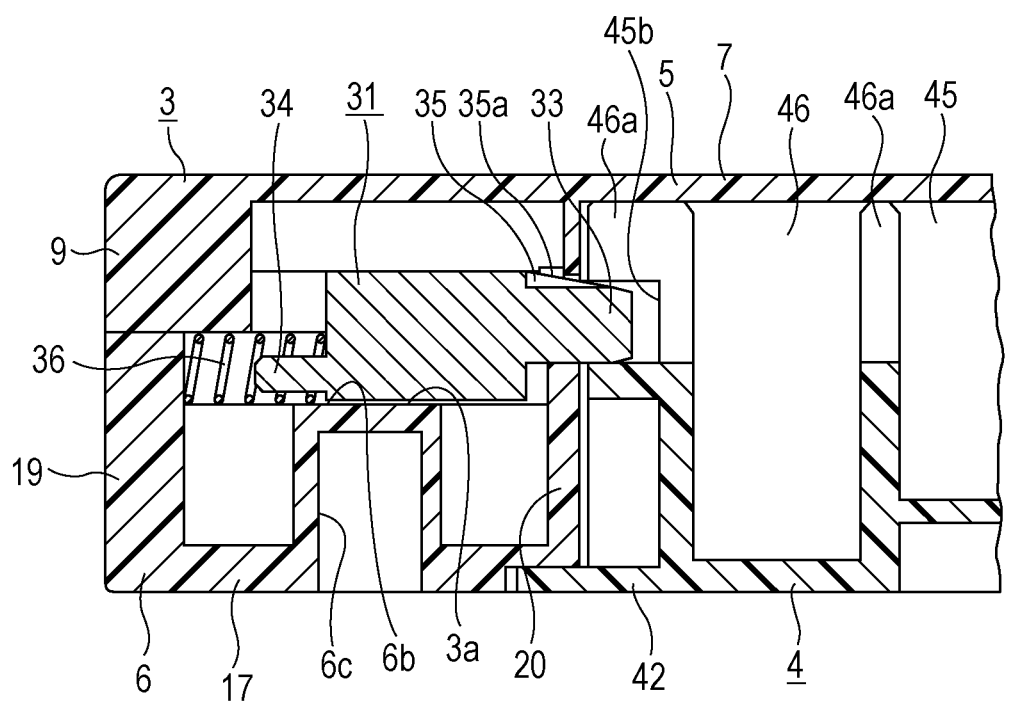
FIG. 16 is an enlarged cross-sectional view showing the first and second shells locked by the lock slider.

In the state in which the first shell 3 and the second shell 4 are coupled and locked as described above, the lock portions 23 and 23 of the lock levers 21 and 21 are respectively partially inserted into the insertion concave portions 38a and 38a formed in the panel portion 38 of the opening/closing panel 37 (see FIGS. 15 and 17). Therefore, when a great impact is applied to the case body 2, for example when the disc cartridge 1 is dropped by mistake, since the movement of the lock portions 23 and 23 is regulated by the insertion concave portions 38a and 38a, the lock levers 21 and 21 are not easily fall, preventing the support shafts 13 and 13 from being broken. Therefore, it is possible to preserve the data recorded in the disc-shaped recording medium 100 in a good state without causing the disc-shaped recording medium 100 to be damaged and to be ejected from the case body 2.

In addition, since the lock levers 21 and 21 are located at the front side of the region where the insertion concave portions 38a and 38a are formed at the panel portion 38, the widths of the first lock concave portions 45a and 45a respectively formed in the side surface portions 43 and 43 of the second shell 4 in the front and rear direction may be decreased. Therefore, it is possible to prevent the disc-shaped recording medium 100 from being separated when the disc-shaped recording medium 100 is inserted into or extracted from the disc insertion/extraction hole 4a of the second shell 4.

In addition, the coil portions 30a and 30a of the bias springs 30 and 30 are respectively supported by the spring support portions 13a and 13a installed to the base surface portion 7 of the support shafts 13 and 13, one arm portions 30b and 30b are respectively supported by the spring-hooking protrusions 14 and 14 installed to the base surface portion 7, and the other arm portions 30c and 30c are respectively supported by the spring support protrusions 23b and 23b protruding toward the base surface portion 7 of the lock levers 21 and 21.

Therefore, all regions of the bias springs 30 and 30 are disposed along the base surface portion 7, and it is possible to decrease the size by effectively utilizing the inner space of the case body 2.

In addition, in the disc cartridge 1, in the state in which the lock levers 21 and 21 are respectively supported by the support shafts 13 and 13, the mounted protrusions 39 and 39 of the opening/closing panel 37 are respectively mounted to the support shafts 13 and 13.

Therefore, it is possible to prevent the support shafts 13 and 13 from falling by the mounted protrusions 39 and 39.

In addition, in regards to the disc cartridge 1, the mounted protrusions 39 and 39 respectively mounted to the support shafts 13 and 13 are located adjacent to each other to be opposite to the lock levers 21 and 21.

Therefore, it is possible to prevent the lock levers 21 and 21 and the bias springs 30 and 30 from separating from the support shafts 13 and 13, and at the same time the movement of the lock levers 21 and 21 in the axial direction of the support shafts 13 and 13 may be regulated to optimize the circuit operation of the lock levers 21 and 21.

In the state in which the first shell 3 and the second shell 4 are coupled as described above, for example, the disc cartridge 1 is inserted from the cartridge insertion/extraction hole, not shown, of the disc changer, and is supported by the lock release mechanism 70 installed to the disc changer.

Figure 19:
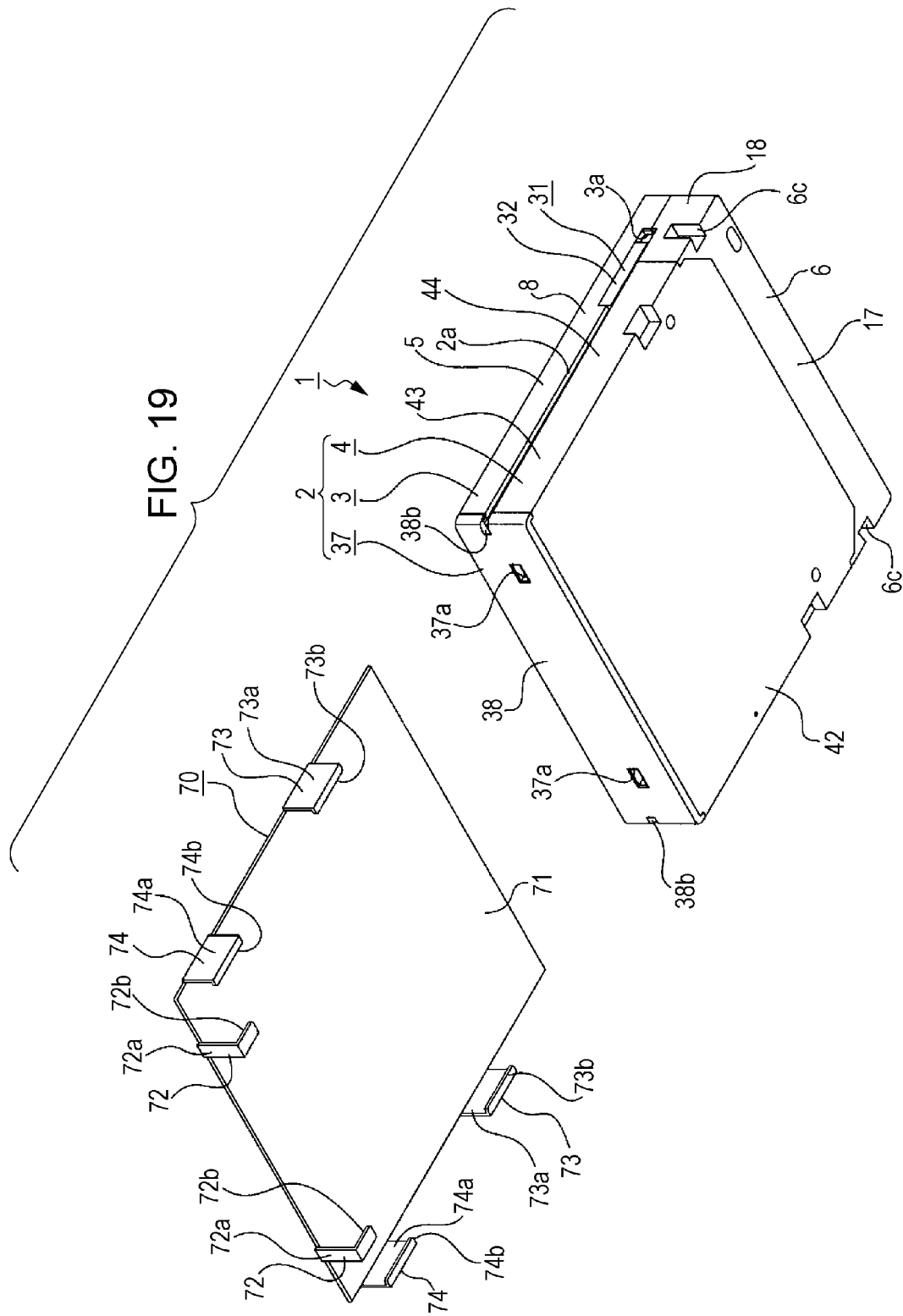
FIG. 19 is a perspective view showing a disc cartridge and a lock release mechanism.

The lock release mechanism 70 is configured, as shown in FIG. 19, for example, by installing components necessary for a rectangular plate-shaped support base 71 oriented in the vertical direction.

Releasing pressing pieces 72 and 72 protruding downwards and located to be spaced apart from each other in the right and left direction are installed to the forward edge of the support base 71. The releasing pressing piece 72 includes a connection portion 72a extending from the support base 71 and oriented in the front and rear direction, and a pressing portion 72b protruding rearwards from the lower edge of the connection portion 72a.

Lock releasing pieces 73 and 73 protruding downwards are respectively installed at the locations at the rear end side of both right and left edges of the support base 71. The lock releasing piece 73 includes a connection portion 73a extending from the support base 71 and oriented in the right and left direction, and a releasing portion 73b protruding inwards from the lower edge of the connection portion 73a.

Auxiliary pieces 74 and 74 protruding downwards are respectively installed at locations of the front end side of both right and left edges of the support base 71. The auxiliary piece 74 includes a connection portion 74a extending from the support base 71 and oriented in the right and left direction, and an insert portion 74b extruding inwards from the lower edge of the connection portion 74a.

Figure 20:
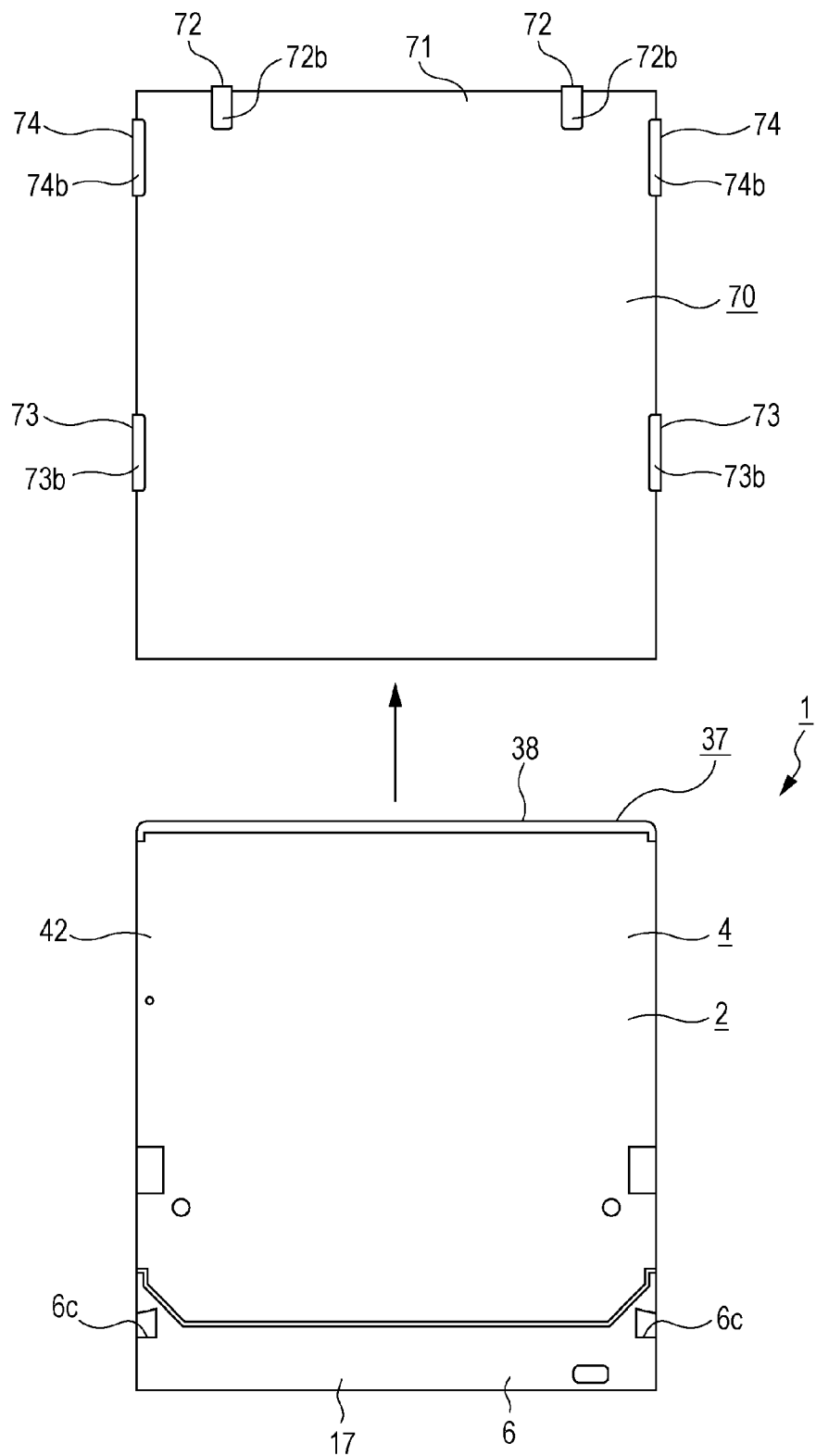
FIG. 20 is a bottom view showing the disc cartridge and the lock release mechanism.

If the disc cartridge 1 is inserted from the cartridge insertion/extraction hole of the disc charger as shown in FIG. 20, the releasing portions 73b and 73b of the releasing pressing pieces 73 and 73 and the insert portions 74b and 74b of the auxiliary pieces 74 and 74 in the lock release mechanism 70 are respectively inserted into the insert grooves 2a and 2a.

Figure 21:
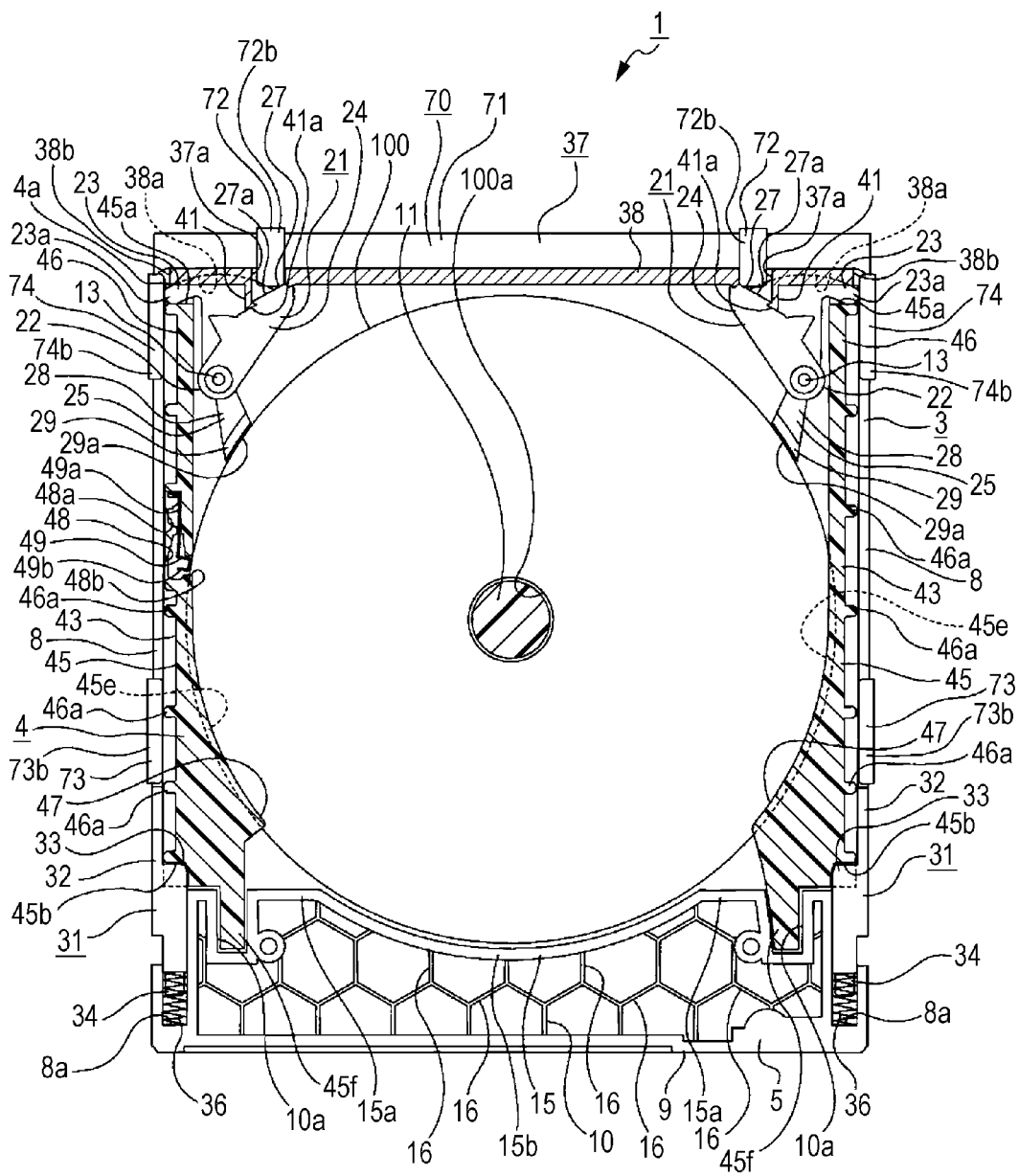
FIG. 21 is a cross-sectional view showing a state just before the lock of the first and second shells is released by the lock release mechanism.
Figure 22:
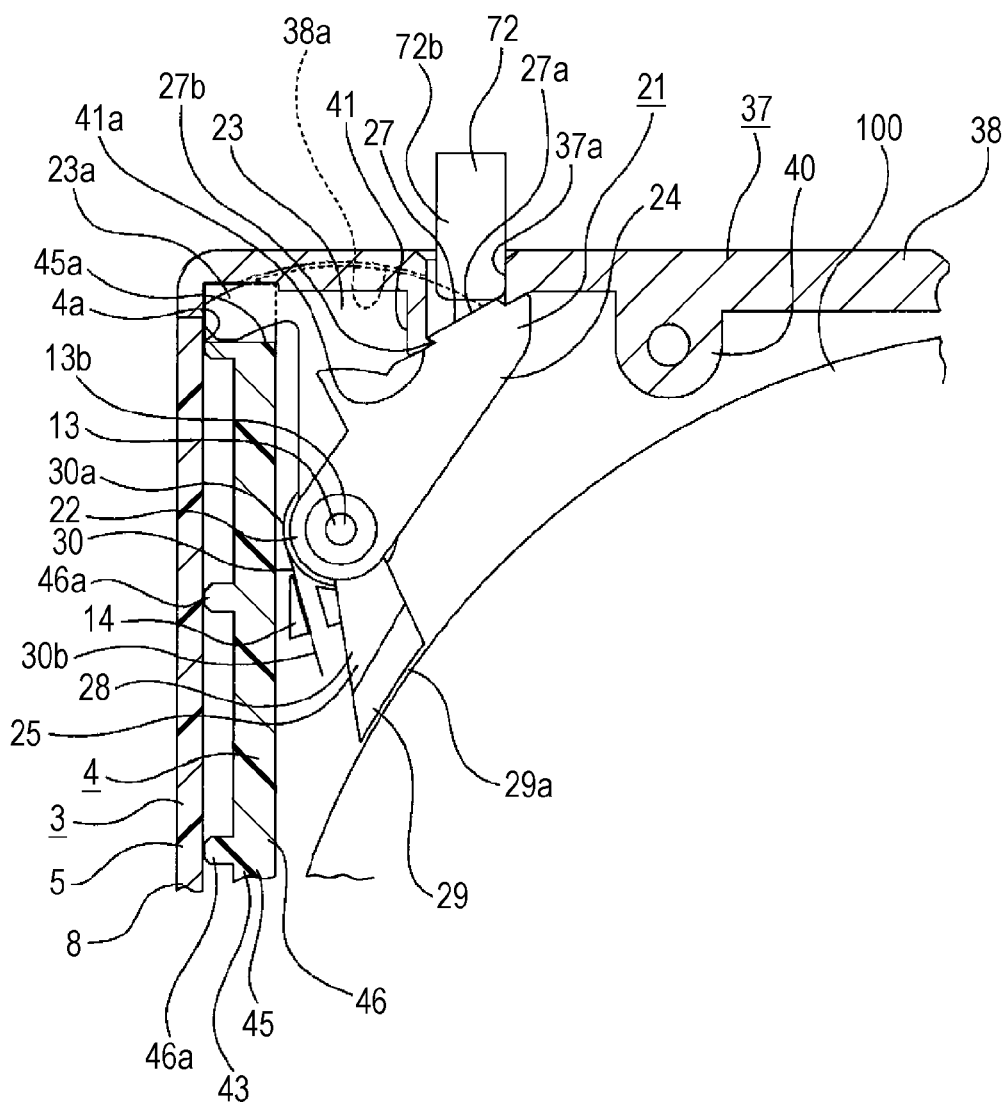
FIG. 22 is an enlarged cross-sectional view showing a state just before the lock of the first and second shells is released by the lock release mechanism.

In addition, if the disc cartridge 1 is inserted from the cartridge insertion/extraction hole, the pressing portions 72b and 72b of the releasing pressing pieces 72 and 72 in the lock releasing mechanism 70 are respectively inserted into the insertion holes 37a and 37a of the opening/closing panel 37 (see FIGS. 21 and 22).

Figure 23:
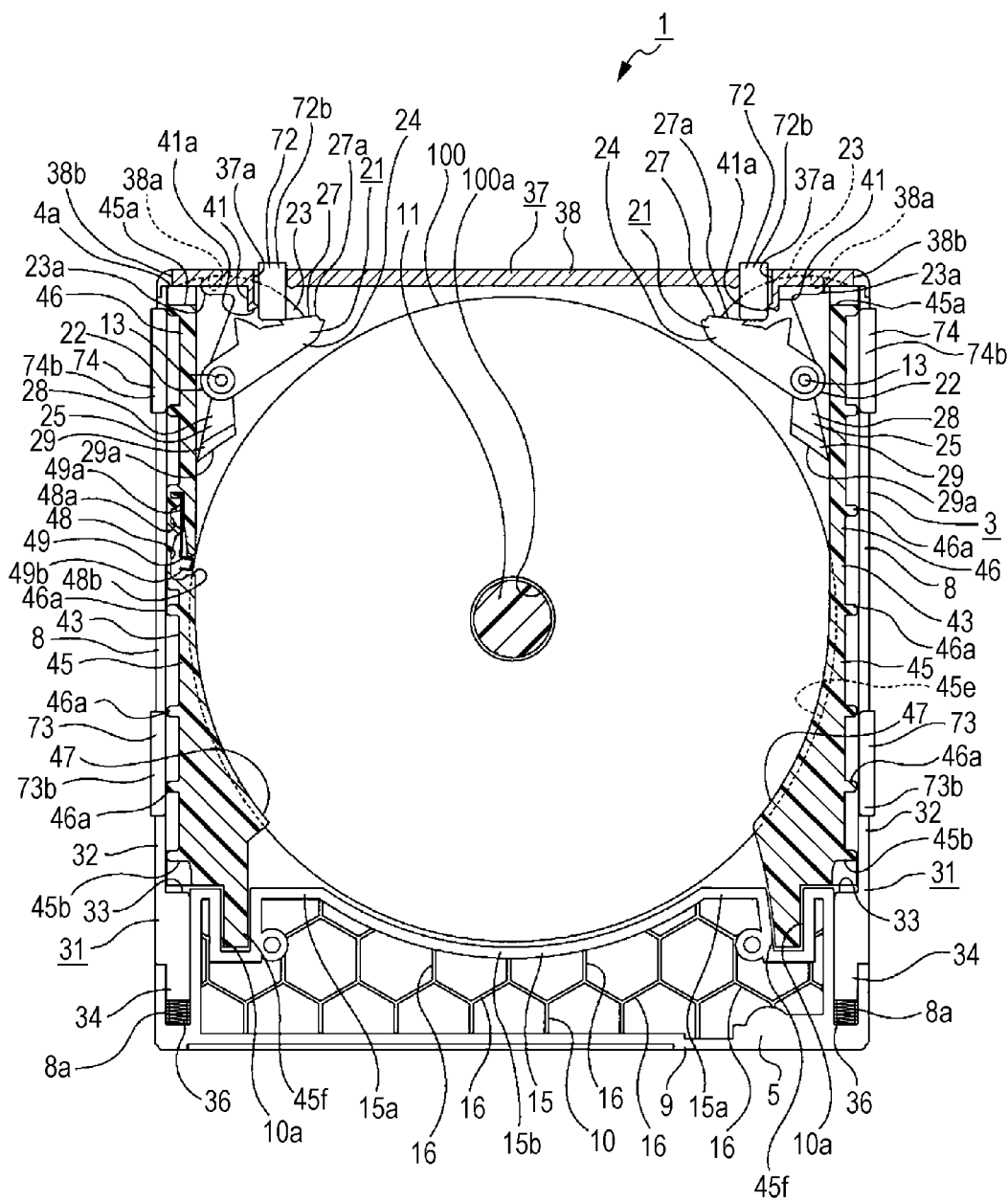
FIG. 23 is a cross-sectional view showing a state in which the lock of the first and second shells is released by the lock release mechanism.
Figure 24:
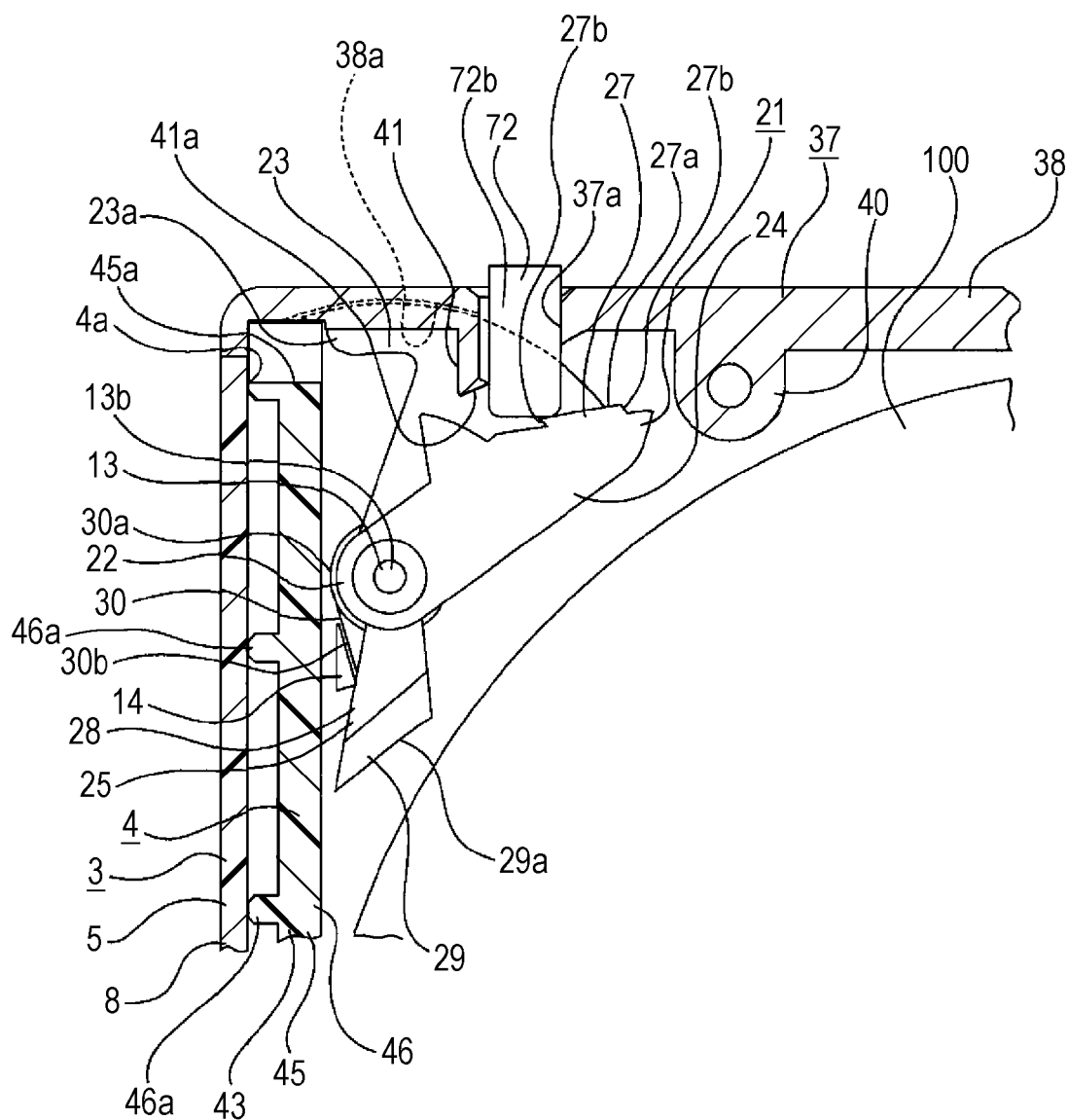
FIG. 24 is an enlarged cross-sectional view showing a state in which the lock of the first and second shells is released by the lock release mechanism.

If the pressing portion 72b of the releasing pressing piece 72 is inserted into the insertion hole 37a of the opening/closing panel 37, the inserting protrusion 27 of the lock releasing portion 24 of the lock lever 21 is pressed rearwards by the pressing portion 72b (see FIGS. 23 and 24). At this time, since the inclined surface 27a inclined in the right and left direction is pressed by the pressing portion 72b with respect to the front and rear direction, the inclined surface 27a smoothly slides with respect to the pressing portion 72b to pivot the lock lever 21, and a load is not easily applied to the releasing pressing piece 72 in a pivoting direction of the lock lever 21.

The lock lever 21 pivots against the biasing force of the bias spring 30 by the pressing portion 72b, the lock protrusion 23a of the lock portion 23 is extracted from the first lock concave portion 45a of the second shell 4, and the lock between the first shell 3 and the second shell 4 by the lock lever 21 is released. When the lock between the first shell 3 and the second shell 4 by the lock lever 21 is released, the regulating surface 29a of the balance portion 25 moves to a misaligned location from the outer circumference of the disc-shaped recording medium 100, and the disc-shaped recording medium 100 of the regulating surface 29a is released.

Figure 25:
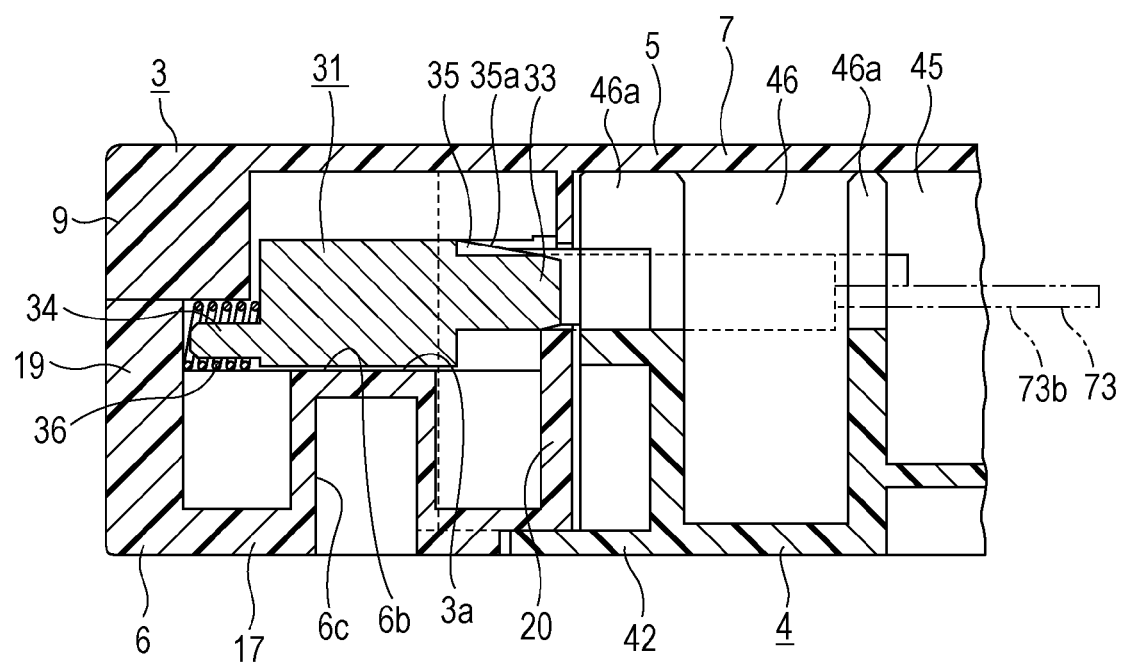
FIG. 25 is an enlarged cross-sectional view showing a state in which the lock of the lock slider is released by the lock release mechanism.
Figure 26:
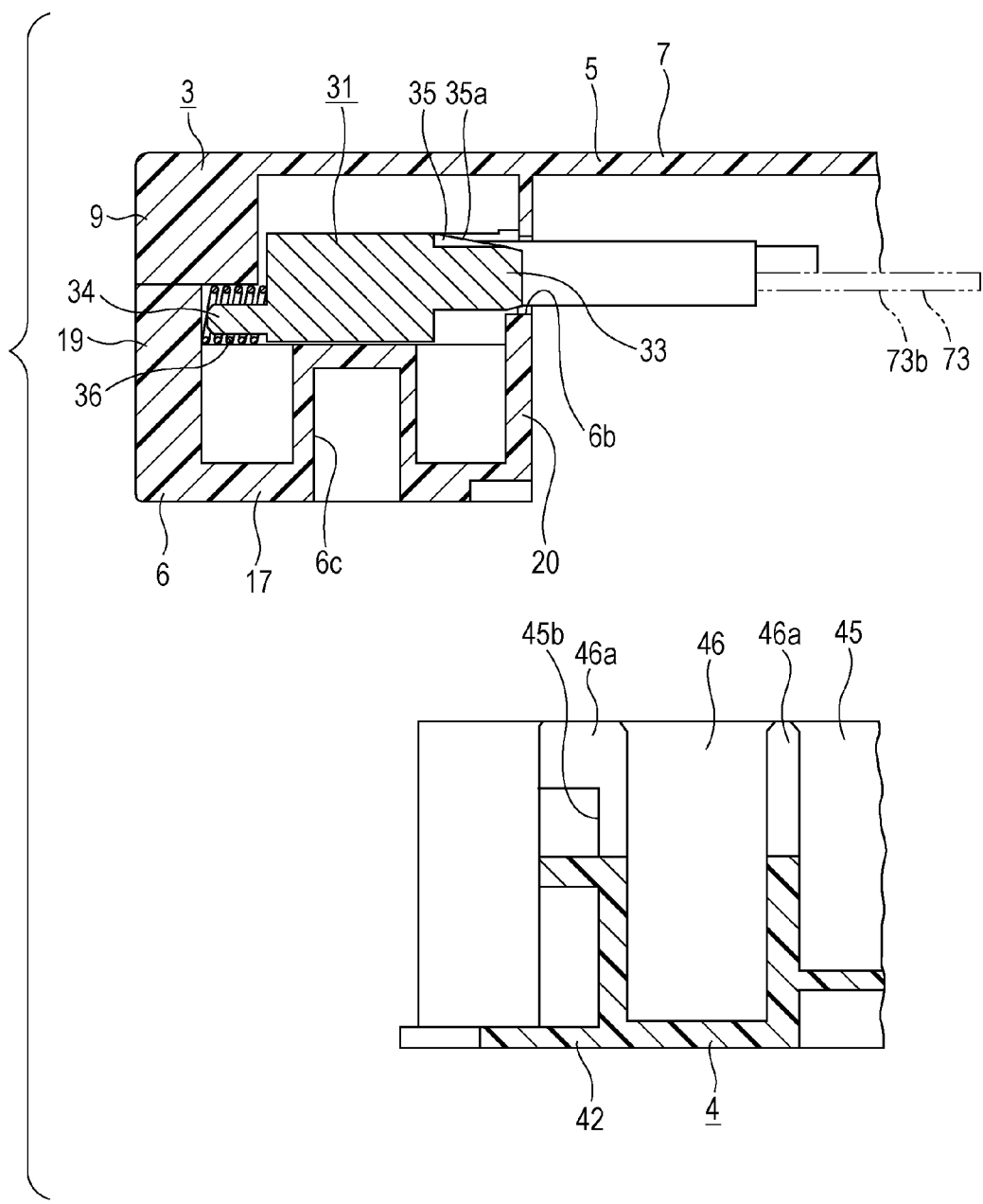
FIG. 26 is an enlarged cross-sectional view showing a state in which the lock of the lock slider is released and the first and second shells are separated by the lock release mechanism.

In addition, if the lock releasing piece 73 is inserted into the insert groove 2a and the supported portion 32 of the lock slider 31 is pressed by the releasing portion 73b, the lock slider 31 moves rearwards against the biasing force of the coil spring 36, and the lock portion 33 is extracted from the second lock concave portion 45b of the second shell 4 (see FIG. 25).

If the lock portion 33 is extracted from the second lock concave portion 45b, the lock between the first shell 3 and the second shell 4 by the lock slider 31 is released, and the lock between the first shell 3 and the second shell 4 by the lock slider 31 is released at the same time when the lock between the first shell 3 and the second shell 4 by the lock lever 21 is released.

If the lock between the first shell 3 and the second shell 4 by the lock levers 21 and 21 and the lock sliders 31 and 31 is released, the first shell 3 and the second shell 4 may be separated in the vertical direction, and for example, the second shell 4 is moved downwards by a moving mechanism, not shown (see FIG. 26) and the received disc-shaped recording medium 100 is extracted from the case body 2 by an extraction mechanism, not shown.

When the disc cartridge 1 is inserted into the disc changer as described above, the grip portions 6c and 6c formed at the case body 2 are gripped by a cartridge support mechanism, not shown, and are supported or moved to predetermined locations.

At this time, in regards to the disc cartridge 1, the grip portions 6c and 6c are formed at any one of the first shell 3 and the second shell 4 of the case body 2, for example at the second shell 4, and the grip portions 6c and 6c are formed in the region other than the projection plane in the axial direction of the disc-shaped recording media 100, 100, . . . received in the case 2.

As described above, in the disc cartridge 1, the grip portions 6c and 6c are present at locations not overlapping the first shell 3 and the second shell 4 and other than the projection plane of the received disc-shaped recording media 100, 100, . . . . Therefore, the grip portions 6c and 6c secure high strength, and a load is not easily applied from the cartridge support mechanism to the received disc-shaped recording media 100, 100, . . . when the disc cartridge 1 is gripped by the cartridge support mechanism. In addition, the data recorded in the disc-shaped recording media 100, 100 may be preserved in a good state.

In addition, since the reinforcing portion 10 and the auxiliary base 6 functioning as a reinforcing portion are installed in the case body 2, the strength of the first shell 3 may be improved, and it is possible to prevent the case body 2 from being damaged or scratched.

In addition, since the reinforcing portion 10 and the auxiliary base 6 are installed at the region where the grip portions 6c and 6c are formed, the strength of the grip portions 6c and 6c is enhanced, and therefore the data recorded in the disc-shaped recording media 100, 100 may be preserved in a better state.

In addition, a plurality of partition walls 16, 16, . . . , 6d, 6d, . . . respectively having a plurality of spaces are installed to the reinforcing portion 10 and the auxiliary base 6.

Therefore, the strength of the case body 2 may be improved with a simple structure. In addition, due to the plurality of spaces, the case body 2 is not easily submerged, and when floating in water, the case body 2 may be collected for a long time. Moreover, the influence of natural disasters such as rainstorms or flood damage and the influence of a rainstorm during transportation may be decreased. In addition, since the space in the disc cartridge 1 has a greater volume than the volume of water of the same weight as the disc cartridge 1, the disc cartridge 1 may have sufficient buoyancy when falling into the water.

In addition, since the reinforcing portion 10 and the auxiliary base 6 are partially installed as the regulating units 15b and 20b regulating locations of the disc-shaped recording media 100, 100, . . . , it is possible to regulate the locations of the disc-shaped recording media 100, 100, . . . after decreasing the number of components and reducing the production cost.

In addition, since a pair of groove portions is formed as the grip portions 6c and 6c, the grip portions 6c and 6c have a simple structure and allow the reduction of production costs, and since the grip portions 6c and 6c do not protrude outwards, the disc cartridge 1 may be devised with a small size.

In the state in which the first shell 3 and the second shell 4 are separated as described above, for example by moving the second shell 4 upwards to be closer to the first shell 3, the first shell 3 and the second shell 4 may be coupled.

When the first shell 3 and the second shell 4 are coupled, the lock levers 21 and 21 are supported at pivoted locations where the lock is released, and the lock sliders 31 and 31 are supported at moved locations where the lock is released (see FIGS. 24 and 25).

If the second shell 4 moves upwards to contact the first shell 3 so that both of the first and second shells 3 and 4 move rearwards, the pressure of the pressing portions 72b and 72b of the releasing pressing pieces 72 and 72 to the inserting protrusions 27 and 27 of the lock releasing portions 24 and 24 is released, and the lock levers 21 and 21 are respectively pivoted by the biasing force of the bias springs 30 and 30. Therefore, the lock protrusions 23a and 23a of the lock portions 23 and 23 are respectively inserted into and engaged with the first lock concave portions 45a and 45a of the second shell 4, and the first shell 3 and the second shell 4 are locked by the lock levers 21 and 21.

Figure 27:
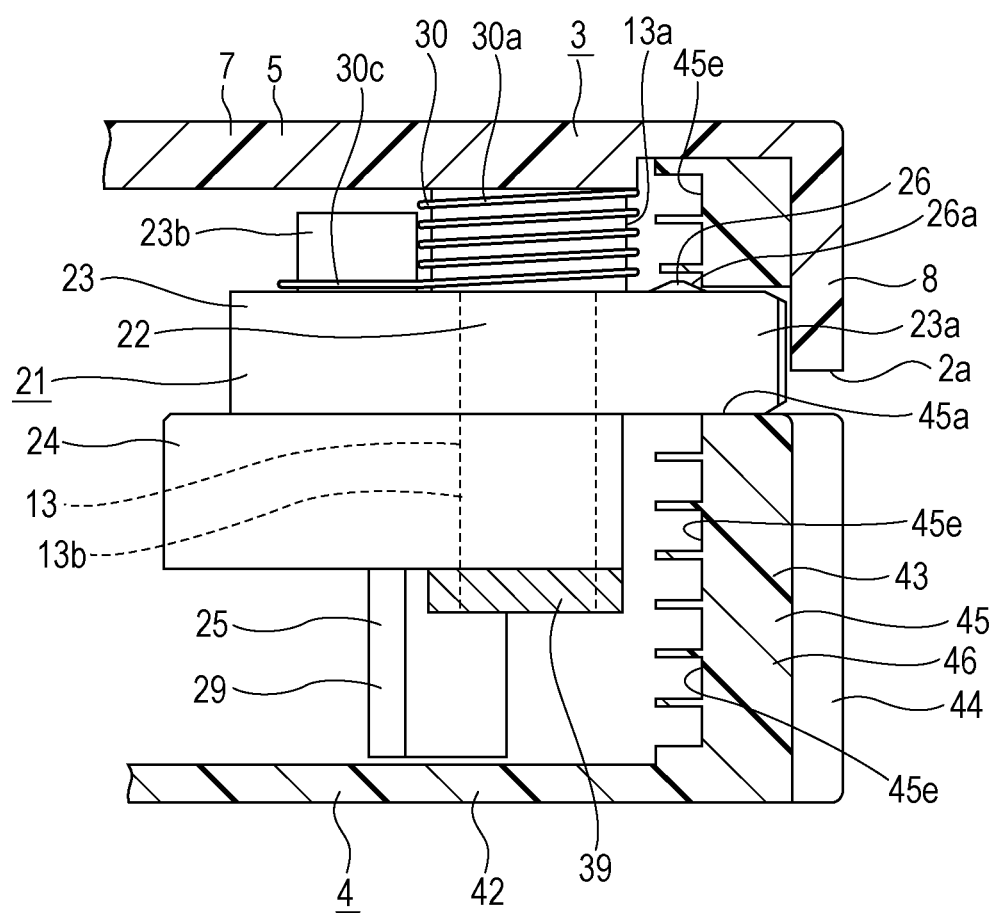
FIG. 27 is an enlarged cross-sectional view showing a state just before the lock lever is pivoted and the first and second shells are coupled.

At this time, since the protrusion portion 26 is installed to the lock portion 23 of the lock lever 21, as shown in FIG. 27, the lock is performed while the sliding contact surface 26a of the protrusion portion 26 comes into contact with the opening edge of the first lock concave portion 45a. Therefore, the second shell 4 is displaced upwards, the first shell 3 is displaced downwards, and the first shell 3 and the second shell 4 are displaced closer and then coupled each other. As described above, the protrusion portion 26 of the lock lever 21 functions as a displacing structure.

When the first shell 3 and the second shell 4 are coupled as described above, the first shell 3 and the second shell 4 are displaced to be closer by the protrusion portion 26 functioning as a displacement structure, and therefore the good sealing property of the first shell 3 and the second shell 4 may be secured.

In addition, when the second shell 4 moves upwards and contacts the first shell 3 so that both of the first and second shells 3 and 4 move rearwards, the pressure of the releasing portions 73b and 73b of the lock releasing pieces 73 and 73 to the supported portions 32 and 32 is released, and the lock sliders 31 and 31 respectively move forward by the biasing force of the coil springs 36 and 36. Therefore, the lock portions 33 and 33 are respectively inserted into and engaged with the second lock concave portions 45b and 45b of the second shell 4, and the first shell 3 and the second shell 4 are locked by the lock sliders 31 and 31.

Figure 28:
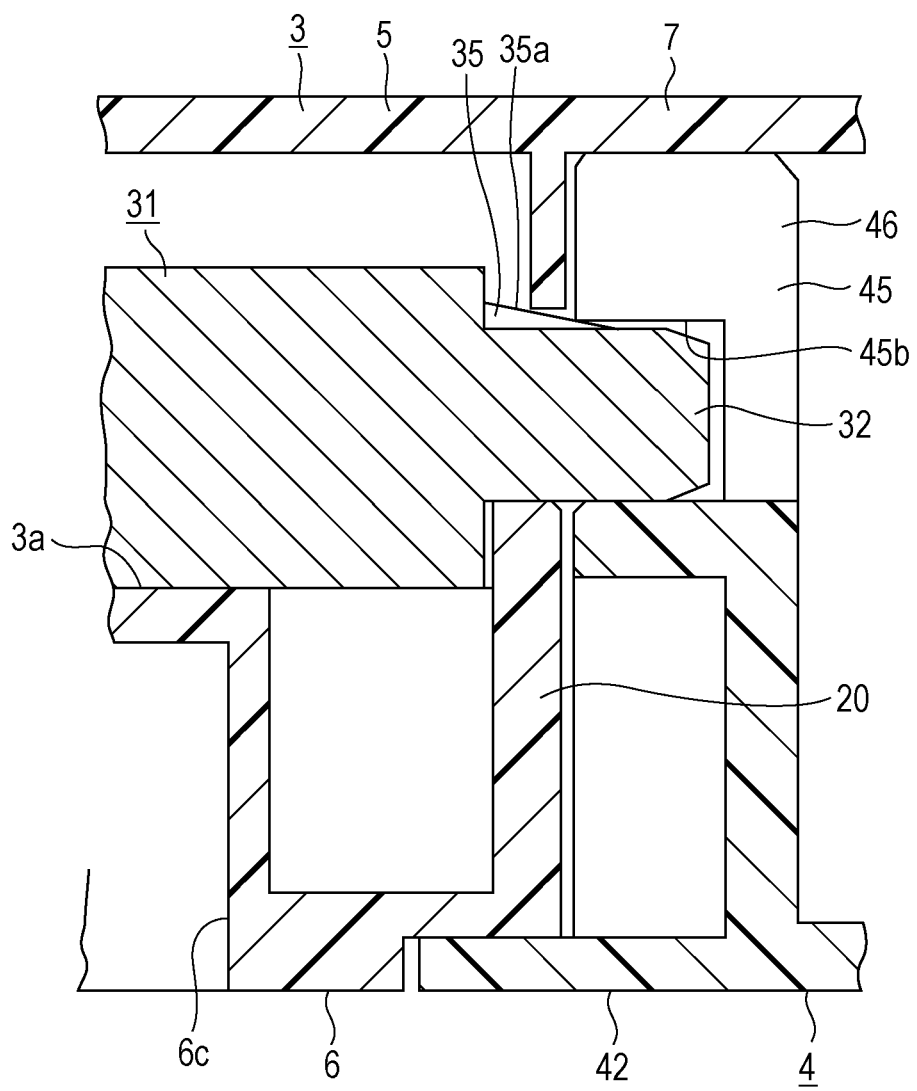
FIG. 28 is an enlarged cross-sectional view showing a state just before the lock slider is moved and the first and second shells are coupled.

At this time, since the protrusion portion 35 is installed at the lock portion 33 in the lock slider 31, as shown in FIG. 28, the sliding contact surface 35a of the protrusion portion 35 comes into contact with the opening edge of the second lock concave portion 45b to perform locking. Therefore, the second shell 4 is displaced upwards, the first shell 3 is displaced downwards, and the first shell 3 and the second shell 4 are displaced to be closer and then coupled to each other. As described above, the protrusion portion 35 of the lock slider 31 functions as a displacement structure.

When the first shell 3 and the second shell 4 are coupled as described above, the first shell 3 and the second shell 4 are displaced to be closer to each other by the protrusion portion 35 functioning as a displacement structure, and therefore it is possible to secure the good sealing property of the first shell 3 and the second shell 4.

In the state where the first shell 3 and the second shell 4 are coupled, the rear end portion of the second shell 4 is disposed at the concave portion 17a of the bottom plate 17 of the first shell 3, and the sealing property of the first shell 3 and the second shell 4 is secured.

In addition, the insert portions 45f and 45f of the inner wall portions 45 and 45 of the second shell 4 are respectively inserted into the insert concave portions 3b and 3b formed in the rear end side of the first shell 3, and the first shell 3 and the second shell 4 are positioned.

As described above, in regards to the disc cartridge 1, when the first shell 3 and the second shell 4 are coupled, the displacement structure for pressing the first shell 3 to the second shell 4 and pressing the second shell 4 to the first shell 3 is installed.

Therefore, the good sealing property for the coupled state of the first shell 3 and the second shell 4 is secured, dust or moisture does not easily penetrate the case body 2 from the outside, and the data recorded in the disc-shaped recording media 100, 100, . . . may be preserved in a good state.

In addition, it is possible to prevent alien substances or moisture from penetrating the disc cartridge 1 when the disc cartridge 1 is transported or during natural disasters.

In the disc cartridge 1, the protrusion portions 26 and 26 of the lock levers 21 and 21 and the protrusion portions 35 and 35 of the lock sliders 31 and 31 are installed as the displacement structure.

Therefore, the displacement structure is simple, and the good sealing property of the first shell 3 and the second shell 4 may be secured without increasing production costs. In addition, since the displacement structure is provided to the lock levers 21 and 21 and the lock sliders 31 and 31, the good sealing property may be reliably secured when the first shell 3 and the second shell 4 are locked in a coupled state.

In addition, though the protrusion portions 26 and 26 of the lock levers 21 and 21 and the protrusion portions 35 and 35 of the lock sliders 31 and 31 are illustrated above as an example of the displacement structure, the displacement structure is not limited to this example.

Figure 29:
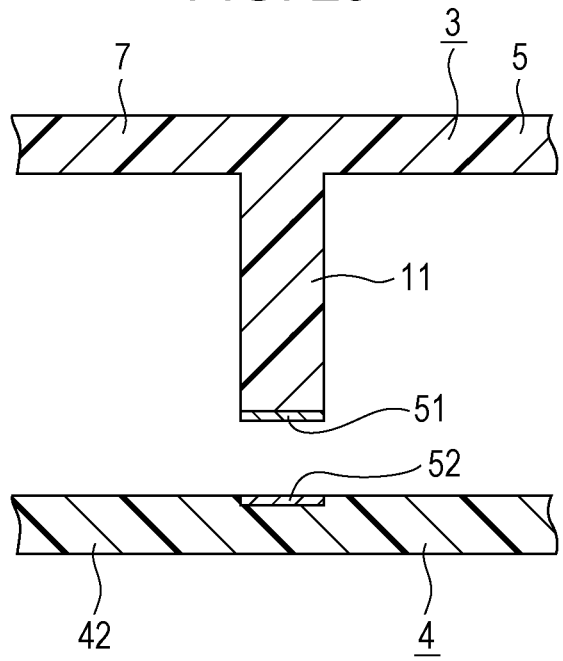
FIG. 29 is an enlarged cross-sectional view showing an example where a magnet is mounted to any one of a center pin and the second shell, and a magnetic body or magnet is mounted to the other one.

For example, as shown in FIG. 29, a magnet 51 may be installed to any one of the front end portion of the center pin 11 installed to the first shell 3 and the base surface portion 42 of the second shell 4, and a magnetic member 52 or a magnet may be disposed to the other one. By doing so, the magnet 51 is adhered to the magnetic member 52 or the magnet, and the good sealing property of the first shell 3 and the second shell 4 may be secured.

Figure 30:
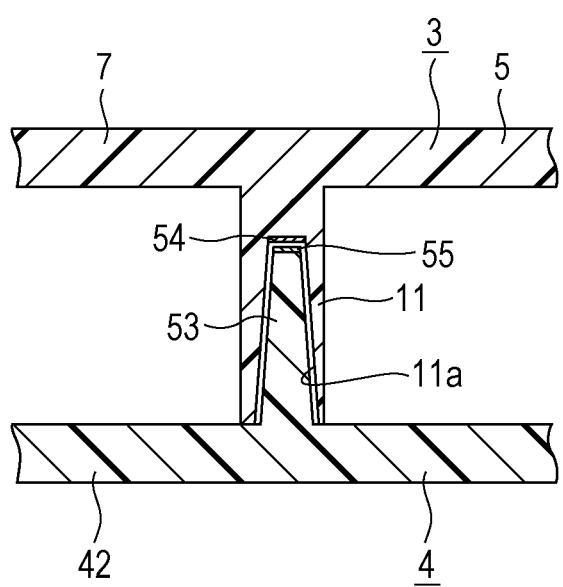
FIG. 30 is an enlarged cross-sectional view showing an example where a magnet is mounted to any one of insertion pins installed to the center pin and the second shell, and a magnetic body or magnet is mounted to the other one.

In addition, for example, as shown in FIG. 30, a disposal hole 11a may be formed in the center pin 11 installed to the first shell 3, an insert pin 53 inserted into the disposal hole 11a may be installed to the second shell 4, a magnet 54 may be disposed at any one of the disposal hole 11a and the insert pin 53, and a magnetic member 55 or a magnet may be disposed at the other one. By doing so, the magnet 54 is adhered to the magnetic member 55 or the magnet, and the good sealing property of the first shell 3 and the second shell 4 may be secured.

The displacement structure also becomes simplified by using the magnets 51 and 54 and the magnetic members 52 and 55 or the magnets, and therefore the good sealing property of the first shell 3 and the second shell 4 may be secured without increasing production costs. In addition, since the center pin 11 functions as a displacement structure, the good sealing property may be reliably secured in the coupled state of the first shell 3 and the second shell 4.

In addition, as the displacement structure, for example, a tension coil spring supported between the lower surface of the base surface portion 7 of the first shell 3 and the upper surface of the base surface portion 42 of the second shell 4 may be used to secure the good sealing property in the coupled state of the first shell 3 and the second shell 4.

In addition, in the case where the displacement structure is installed to secure the sealing property of the first shell 3 and the second shell 4, any one of the first shell 3 and the second shell 4 may be displaced with respect to the other. In this case, the lighter one of the first shell 3 and the second shell 4 is preferably configured to make displacement in order to decrease a driving force for the displacement. In the disc cartridge 1, since the disc-shaped recording media 100, 100, . . . are supported by the support grooves 45e and 45e of the second shell 4, the first shell 3 is more probably lighter than the second shell 4, and the first shell 3 is preferably configured to make displacement with respect to the second shell 4.

[Modified Examples of Lock Lever]

Hereinafter, modified examples of the lock lever will be described.

In addition, lock levers according to the following modified examples are only partially different from the above lock lever 21. Therefore, regarding the lock levers according to the following modified examples, only different points in comparison to the lock lever 21 will be described in detail, and the other components will be designated by the same reference symbols as that of the lock lever 21 and not described in detail.

Figure 31:
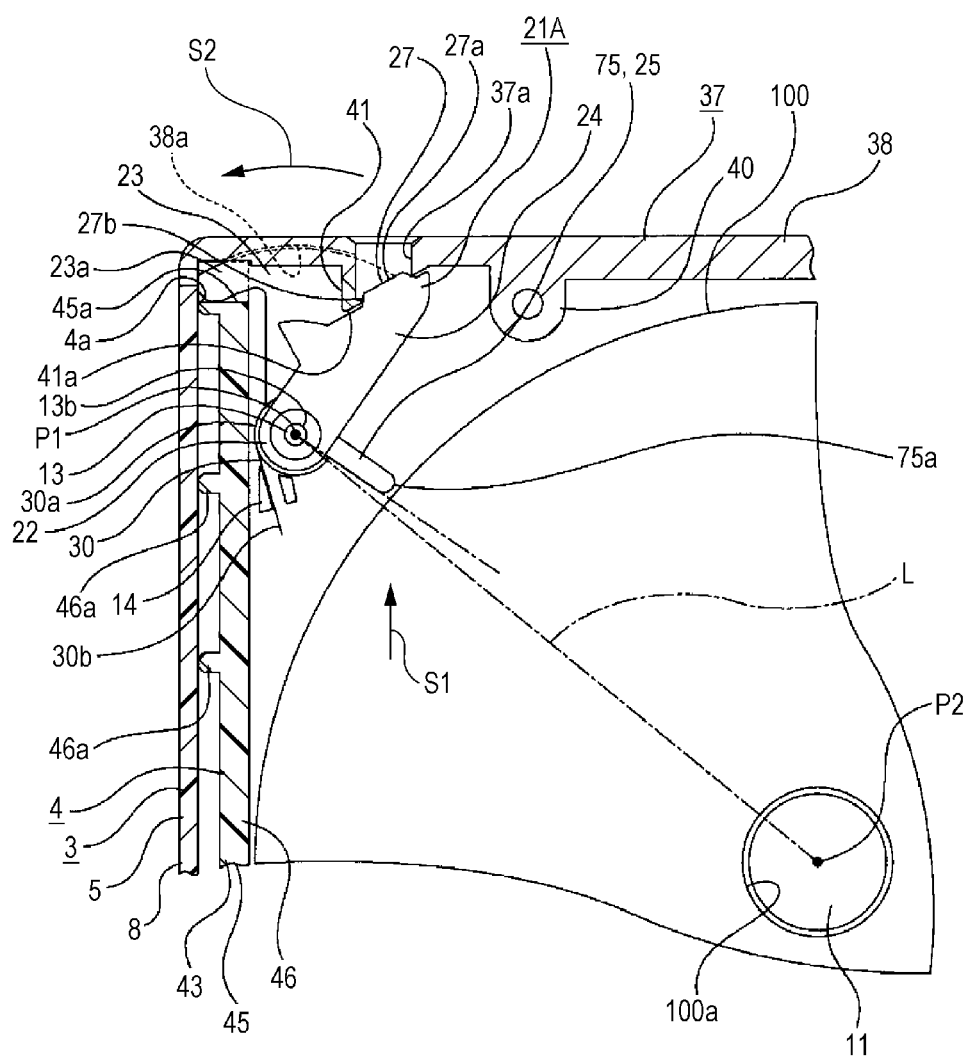
FIG. 31 is an enlarged cross-sectional view showing a lock lever according to a first modified example, in a state in which the first and second shells are locked.

First, a lock lever 21A according to a first modified example will be described (see FIG. 31).

The lock levers 21A and 21A include supported portions 22 and 22, lock portions 23 and 23, lock releasing portions 24 and 24, and location regulating protrusions 75 and 75.

The location regulating protrusion 75 protrudes in a direction orthogonal to the axial direction of the support shaft 13, namely in a horizontal direction, from the supported portion 22, and the front end surface 75a is opposite to the outer circumference of the disc-shaped recording media 100, 100, . . . received in the case body 2. The front end surface 75a of the location regulating protrusion 75 has a curved shape convex at the front end side.

In addition, a balance portion 25 is installed to the lock lever 21A, and the balance portion 25 may be installed as the location regulating protrusion 75. In this case, the balance portion 25 and the location regulating protrusion 75 are configured as the same component of the lock lever 21A, and the location regulating protrusion 75 is formed with the same shape as the balance portion 25.

The location regulating portion 75 is located at the disc insertion/extraction hole 4a rather than a line L connecting the axial center P1 of the support shaft 13 and the center P2 of the disc-shaped recording medium 100, in the locked state in which the first shell 3 and the second shell 4 are locked by the lock lever 21A.

By locating the location regulating protrusion 75 of the lock lever 21A in the above location relation with respect to the disc-shaped recording medium 100, when a great impact is applied to the case body 2, for example when the disc cartridge 1 is dropped by mistake, the locked state of the case body 2 by the lock lever 21A is not released. In other words, even though a great impact is applied to the case body 2 such that the disc-shaped recording media 100, 100, . . . move in an S1 direction discharged from the case body 2, the outer circumference of the disc-shaped recording media 100, 100, . . . is in contact with the location regulating protrusion 75, and this contact applies a pivoting force to the lock lever 21A in an S2 direction. Since the S2 direction is a pivoting direction in which the lock lever 21A locks the first shell 3 and the second shell 4, the locked state of the case body 2 by the lock lever 21A is not released.

Therefore, when a great impact is applied to the case body 2, the locked state of the case body 2 by the lock lever 21A is not released, and it may be secured that the disc-shaped recording media 100, 100, . . . are stably supported by the case body 2.

In addition, when a great impact is applied to the case body 2, if the lock lever 21A pivots in a direction opposite to the S2 direction in which the lock lever 21A locks the case body 2, the location regulating protrusion 75 contacts the outer circumference of the disc-shaped recording media 100, 100, . . . so that the disc-shaped recording media 100, 100, . . . are pressed in a direction to be received in the case body 2.

Therefore, when the first shell 3 and the second shell 4 are separated in the vertical direction, the panel portion 38 does not contact the outer circumference of the disc-shaped recording media 100, 100, . . . , and it is possible to prevent the disc-shaped recording media 100, 100, . . . from being damaged or broken.

In addition, as described above, since the front end surface 75a of the location regulating protrusion 75 has a curved shape convex at the front end side, when the front end surface 75a of the location regulating protrusion 75 contacts the outer circumference of the disc-shaped recording media 100, 100, . . . , it is possible to prevent the outer circumference of the disc-shaped recording media 100, 100, . . . from being scratched or broken.

In addition, by installing the balance portion 25 as the location regulating protrusion 75, it is possible to simplify the structure of the lock lever 21A and integrate functions of the lock lever 21A.

Next, a lock lever 21B according to a second modified example will be described (see FIGS. 32 to 35).

Figure 32:
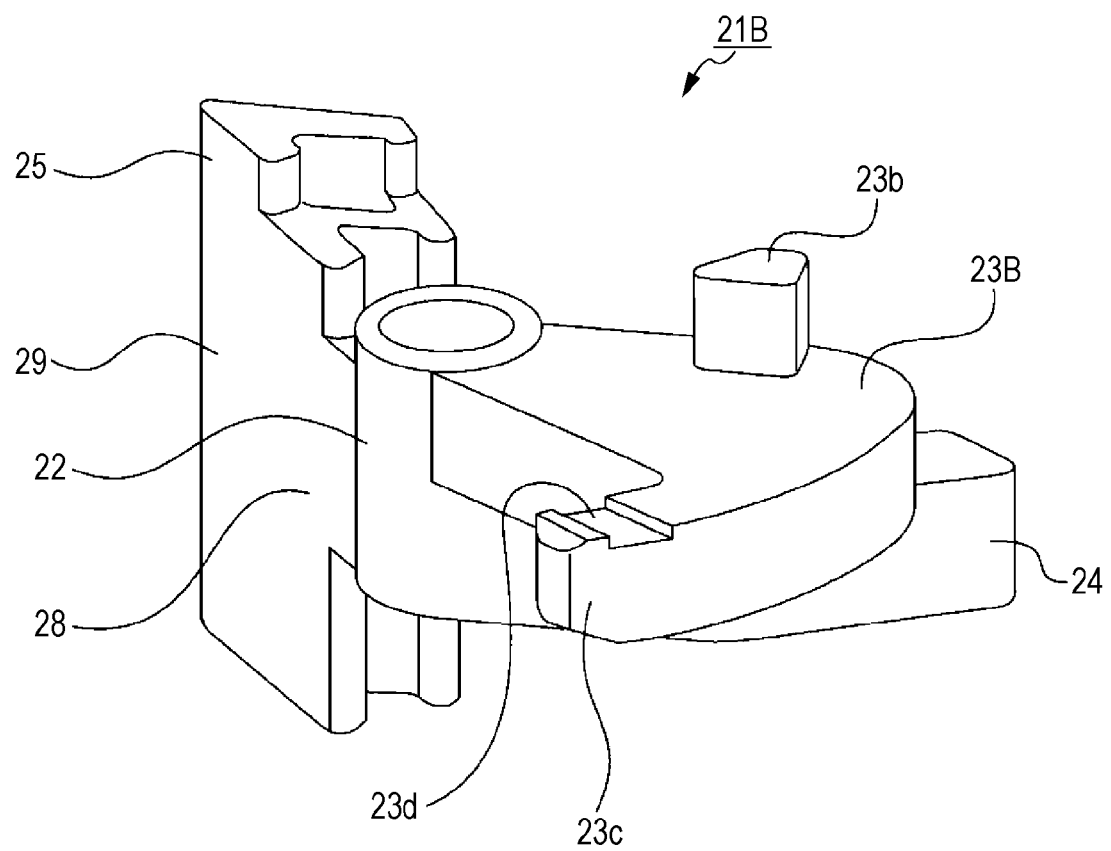
FIG. 32 is for illustrating a lock lever according to a second modified example together with FIGS. 33 to 35.

As shown in FIG. 32, the lock levers 21B and 21B include supported portions 22 and 22, lock portions 23B and 23B, lock releasing portions 24 and 24, and balance portions 25 and 25.

The lock portion 23B includes a lock protrusion 23c protruding laterally and formed at the front end portion, and a spring support protrusion 23b is installed to the lock portion 23B. A fitting concave portion 23d opened upwards is formed in the upper surface of the lock protrusion 23c.

The first lock concave portions 45a and 45a are formed in the second shell 4 as described above, and the lock protrusions 23c and 23c of the lock levers 23B and 23B are respectively inserted into and engaged with the first lock concave portions 45a and 45a.

Figure 33:
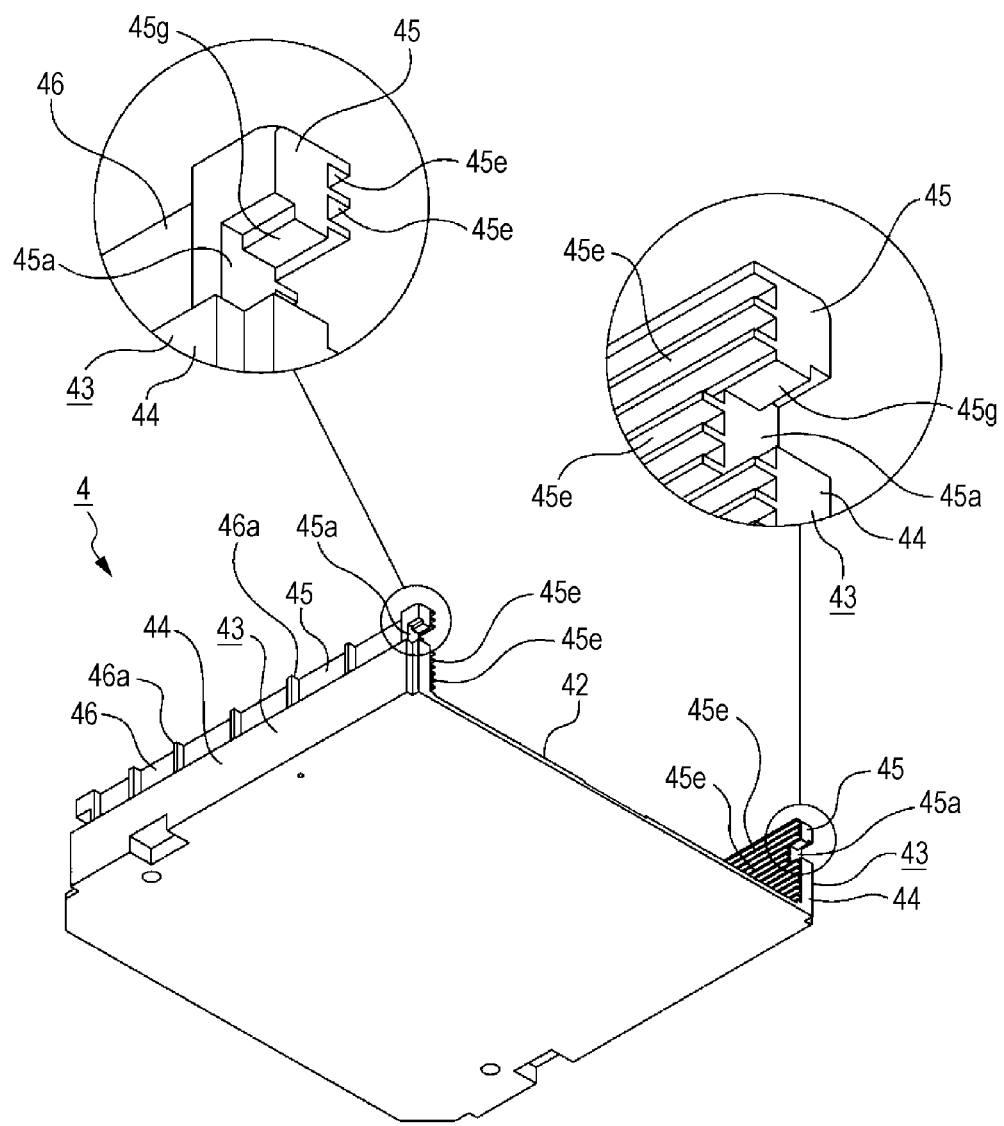
FIG. 33 is a perspective view showing the second shell having a first lock concave portion to which a fitting protrusion is installed.

A fitting protrusion 45g protruding downwards is installed to the upper surface (the surface oriented downwards) of the first lock concave portion 45a of the second shell 4 as shown in FIG. 33, and the fitting protrusion 45g may be fitted to the fitting concave portion 23d in the state in which the lock protrusion 23c of the lock lever 23B is inserted into the lock concave portion 45a.

Figure 34:
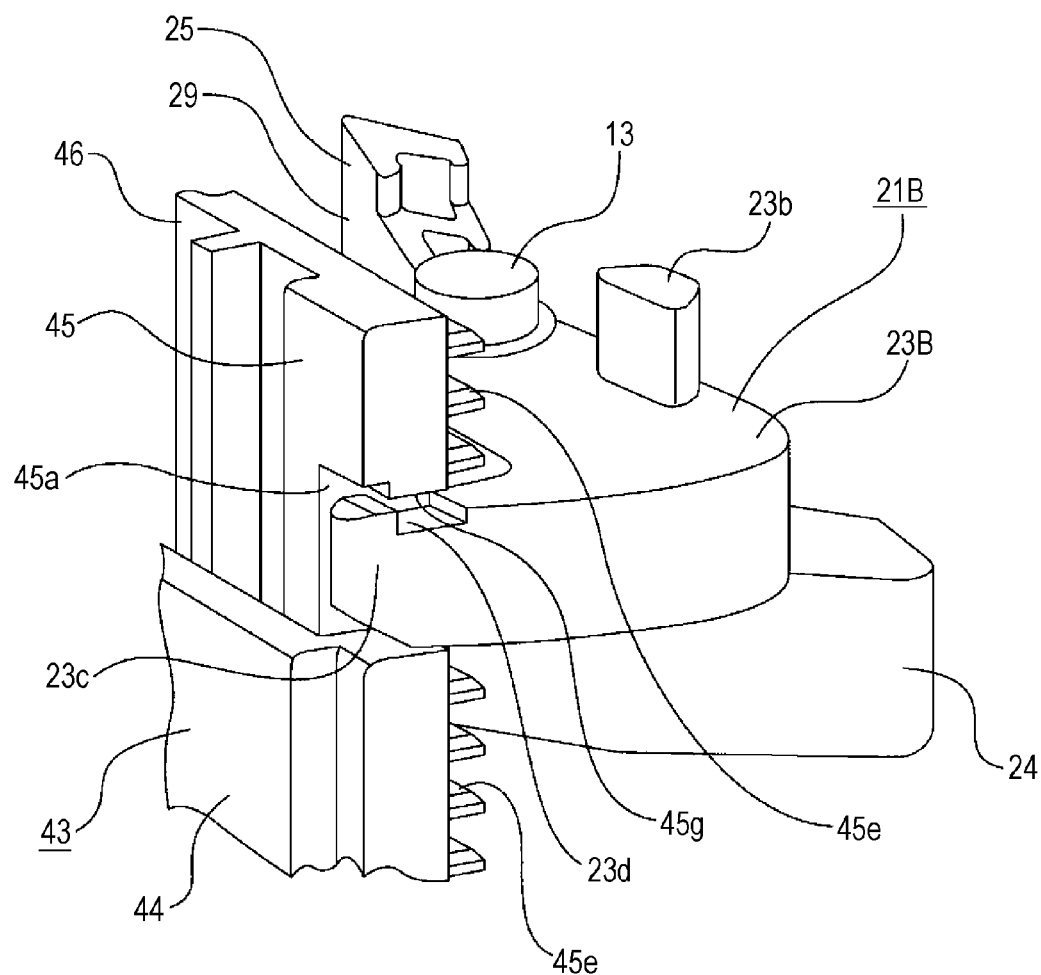
FIG. 34 is an enlarged perspective view showing a lock protrusion of the lock lever, inserted into the first lock concave portion of the second shell.

In the state in which the first shell 3 and the second shell 4 are coupled, if the lock levers 21B and 21B respectively pivot by the biasing force of the bias springs 30 and 30 in a direction (in an outward direction) in which the lock protrusions 23c and 23c of the lock portions 23B and 23B are spaced apart from each other, the lock protrusions 23c and 23c are respectively inserted into the first lock concave portions 45a and 45a of the second shell 4, and the first shell 3 and the second shell 4 are locked in a coupled state (see FIG. 34).

In the state in which the first shell 3 and the second shell 4 are coupled, the first shell 3 may be moved slightly with respect to the second shell 4 in the vertical direction. Therefore, in the state in which the first shell 3 moves downwards with respect to the second shell 4 and the lock protrusions 23c and 23c of the lock levers 21B and 21B are pressed to the lower surface (the surface oriented upwards) of the first lock concave portions 45a and 45a, the upper surfaces of the lock protrusions 23c and 23c are located slightly below the upper surfaces of the first lock concave portions 45a and 45a (see FIG. 34).

In the first shell 3 and the second shell 4, since the upper surfaces of the lock protrusions 23c and 23c are respectively located slightly below the upper surfaces of the first lock concave portions 45a and 45a, the lock protrusions 23c and 23c may be easily inserted into and extracted from the first lock concave portions 45a and 45a.

In addition, when a great impact is applied to the case body 2, for example, when the disc cartridge 1 is dropped by mistake, a force in a pivoting direction in which the lock protrusions 23c and 23c are respectively extracted from the first lock concave portions 45a and 45a may be applied to the lock levers 21B and 21B by the impact.

Figure 35:
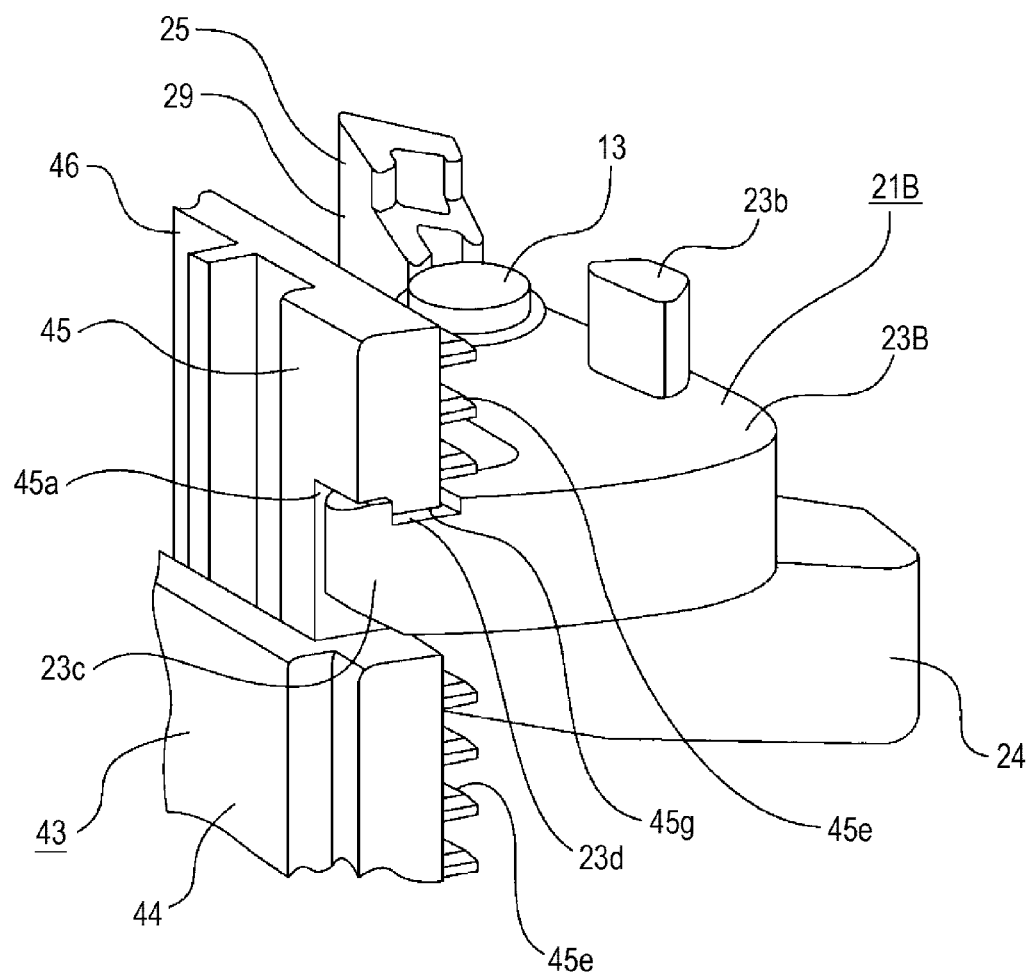
FIG. 35 is an enlarged perspective view showing the fitting protrusion inserted into the fitting concave portion, in a state in which the lock protrusion of the lock lever is inserted into the first lock concave portion of the second shell.

However, when an impact is applied, the first shell 3 and the second shell 4 move so as to be away from each other in the vertical direction, and the fitting protrusions 45g and 45g installed to the first lock concave portions 45a and 45a are respectively fitted to the fitting concave portions 23d and 23d (see FIG. 35).

Therefore, the pivotal movement in a direction in which the lock protrusions 23c and 23c of the lock levers 21B and 21B are respectively extracted from the first lock concave portions 45a and 45a is regulated, and therefore it is possible to prevent the lock between the first shell 3 and the second shell 4 from being released unnecessarily by an impact.

In addition, though the fitting concave portion 23d is formed at the lock lever 21B and the fitting protrusion 45g is installed to the first lock concave portion 45a in the above example, on the contrary, it is also possible that a fitting protrusion is installed to the lock lever and a fitting concave portion is formed at the first lock concave portion.

The detailed shape and structure of each component described in the above embodiments are just an example of the present disclosure, and the scope of the present disclosure should not be limited thereto.

The present disclosure contains subject matter related to that disclosed in Japanese Priority Patent Application JP 2010-253066 filed in the Japan Patent Office on Nov. 11, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A disc cartridge comprising:
a case body capable of receiving a plurality of disc-shaped recording media in parallel to an axial direction of a center pin thereof so that a first shell having a base surface portion parallel to a recording surface of the disc-shaped recording media and a second shell having a base surface portion parallel to the recording surface of the disc-shaped recording media are coupled to or separated from each other by engagement or disengagement in the axial direction; and a lock lever pivotally supported on a surface perpendicular to the axial direction in the case body and locking the first shell and the second shell in a coupled state, wherein the first shell and the second shell are separated to form a disc insertion/extraction hole through which the disc-shaped recording media are inserted into or discharged from the case body, wherein a support shaft serving as a pivoting point of the lock lever is installed to the case body, and wherein the lock lever includes a supported portion supported by the support shaft, a lock portion protruding from the supported portion and locking the first shell and the second shell, and a balance portion protruding from the supported portion in a direction approximately opposite to the direction in which the lock portion protrudes wherein the difference between the diameter of the center pin inserted into a center hole of the received disk-shaped recording media and the diameter of the center hole of the disc-shaped recording media is set to A, wherein the difference between the diameter of a circle extending from an arc of a regulating surface formed at the balance portion of the lock lever for regulating the location of the disk shaped recording media and the diameter of the disc-shaped recording media is set to B, wherein the difference between the outer circumference of the disc-shaped recording media and the inner surface of an opening/closing panel installed to the first shell for opening or closing the disk insertion/extraction hole when the disc-shaped recording media is pressed to the center pin in a direction of being inserted from the disc insertion/extraction hole is set to C, and wherein C>A>B.

2. The disc cartridge according to claim 1, wherein the arc of the regulating surface of the lock lever is along the outer circumference of the disc-shaped recording media.

3. The disc cartridge according to claim 2, wherein the center pin is inserted to the case body and regulates the location of the disc-shaped recording media is installed to the case body.

4. A disk cartridge comprising:

a case body capable of receiving a plurality of disc-shaped recording media in parallel to an axial direction of a center in thereof so that a first shell having a base surface portion parallel to a recording surface of the disc-shaped recording media and a second shell having a base surface portion parallel to the recording surface of the disc-shaped recording media are coupled to or separated from each other by engagement or disengagement in the axial direction; and a lock lever pivotally supported on a surface perpendicular to the axial direction in the case body and locking the first shell and the second shell in a coupled state, wherein the first shell and the second shell are separated to form a disc insertion/extraction hole through which the disc-shaped recording media are inserted into or discharged from the case body, wherein a support shaft serving as a pivoting point of the lock lever is installed to the case body, wherein the lock lever includes a supported portion supported by the support shaft, a lock portion protruding from the supported portion and locking the first shell and the second shell, and a balance portion protruding from the supported portion in a direction approximately opposite to the direction in which the lock portion protrudes, wherein a regulating surface for regulating the location of the disc-shaped recording media received in the case body is formed at the balance portion of the lock lever, wherein the regulating surface of the lock lever has an arc surface shape along the outer circumference of the disc-shaped recording media, wherein the center in is inserted into a center hole of the received disc-shaped recording media and regulating the location of the disc-shaped recording media is installed to the case body, wherein an opening/closing panel for opening or closing the disc insertion/extraction hole is installed to the first shell, wherein the difference between the diameter of the center pin and the diameter of the center hole of the disc-shaped recording media is set to A, wherein the difference between the diameter of a circle extending from the arc of the regulating surface of the lock lever and the diameter of the disc-shaped recording media is set to B, and wherein the difference between the outer circumference of the disc-shaped recording media and the inner surface of the opening/closing panel when the disc-shaped recording media is pressed to the center pin in a direction of being inserted from the disc insertion/extraction hole is set to C, and wherein C>A>B.

* * * * *